(12) United States Patent
Okumura

(10) Patent No.: US 12,163,881 B2
(45) Date of Patent: Dec. 10, 2024

(54) GAS DETECTION DEVICE, GAS DETECTION SYSTEM, AND GAS DETECTION METHOD

(71) Applicant: NEC Platforms, Ltd., Kawasaki (JP)

(72) Inventor: Fujio Okumura, Kanagawa (JP)

(73) Assignee: NEC Platforms, Ltd., Kanagawa (JP)

(*) Notice: Subject to any disclaimer, the term of this patent is extended or adjusted under 35 U.S.C. 154(b) by 281 days.

(21) Appl. No.: 17/780,119

(22) PCT Filed: Nov. 9, 2020

(86) PCT No.: PCT/JP2020/041666
§ 371 (c)(1),
(2) Date: May 26, 2022

(87) PCT Pub. No.: WO2021/111812
PCT Pub. Date: Jun. 10, 2021

(65) Prior Publication Data
US 2022/0291123 A1    Sep. 15, 2022

(30) Foreign Application Priority Data
Dec. 4, 2019  (JP) ................................ 2019-219663

(51) Int. Cl.
*G01N 21/35* (2014.01)
*G01J 3/02* (2006.01)
(Continued)

(52) U.S. Cl.
CPC .......... *G01N 21/3504* (2013.01); *G01J 3/021* (2013.01); *G01J 3/0229* (2013.01);
(Continued)

(58) Field of Classification Search
CPC .......... G01J 3/021; G01J 3/0229; G01J 3/027; G01J 3/42; G01N 21/3504;
(Continued)

(56) References Cited

U.S. PATENT DOCUMENTS

| | | | | |
|---|---|---|---|---|
| 10,330,593 B1* | 6/2019 | Dobler | ................... | G08B 21/14 |
| 2007/0097371 A1* | 5/2007 | Parker | ................... | G01N 21/39 |
| | | | | 250/343 |

(Continued)

FOREIGN PATENT DOCUMENTS

| | | |
|---|---|---|
| JP | 2007-506947 A | 3/2007 |
| JP | 2014-021128 A | 2/2014 |

(Continued)

OTHER PUBLICATIONS

International Search Report for PCT Application No. PCT/JP2020/041666, mailed on Dec. 22, 2020.

(Continued)

*Primary Examiner* — Mark R Gaworecki

(57) ABSTRACT

A gas detection that includes a projector including a light source that emits laser light having a wavelength at which an absorption rate by a detection target gas is high and a spatial light modulator that modulates the laser light emitted from the light source, a projection control unit that controls projection light to be projected toward a retroreflector by causing the light source to emit the laser light and setting a pattern of a modulation part of the spatial light modulator, a light receiver that receives reflected light of the projection light reflected by the retroreflector and measures an intensity of the received reflected light; and a leakage determination unit that acquires the intensity of the reflected light from the light receiver and determines leakage of the detection target gas in a detection space with the retroreflector based on the intensity of the reflected light.

10 Claims, 22 Drawing Sheets

(51) Int. Cl.
*G01J 3/42* (2006.01)
*G01N 21/3504* (2014.01)

(52) U.S. Cl.
CPC ............. *G01J 3/027* (2013.01); *G01J 3/42* (2013.01); *G01N 2021/3513* (2013.01); *G01N 2201/063* (2013.01); *G01N 2201/0636* (2013.01)

(58) Field of Classification Search
CPC ..... G01N 2021/3513; G01N 2201/063; G01N 2201/0636
See application file for complete search history.

(56) References Cited

U.S. PATENT DOCUMENTS

2011/0038507 A1* 2/2011 Hager ................ G01N 21/3504
382/100

2013/0258315 A1 10/2013 Kohlert et al.

FOREIGN PATENT DOCUMENTS

| JP | 2018-087748 A | 6/2018 | |
|---|---|---|---|
| JP | 2018-185190 A | 11/2018 | |
| WO | WO-2012002979 A1 * | 1/2012 | .......... G01M 15/108 |
| WO | WO-2014189724 A1 * | 11/2014 | ......... G01N 21/3504 |
| WO | 2014/196450 A1 | 12/2014 | |
| WO | 2017/077776 A1 | 5/2017 | |

OTHER PUBLICATIONS

English translation of Written opinion for PCT Application No. PCT/JP2020/041666, mailed on Dec. 22, 2020.
JP Office Communication for JP2019-219663 dated Nov. 2, 2020.
JP Office Action for JP2019-219663 dated Nov. 4, 2019.
JP Office Action for JP2019-219663 dated Apr. 27, 2020.

* cited by examiner

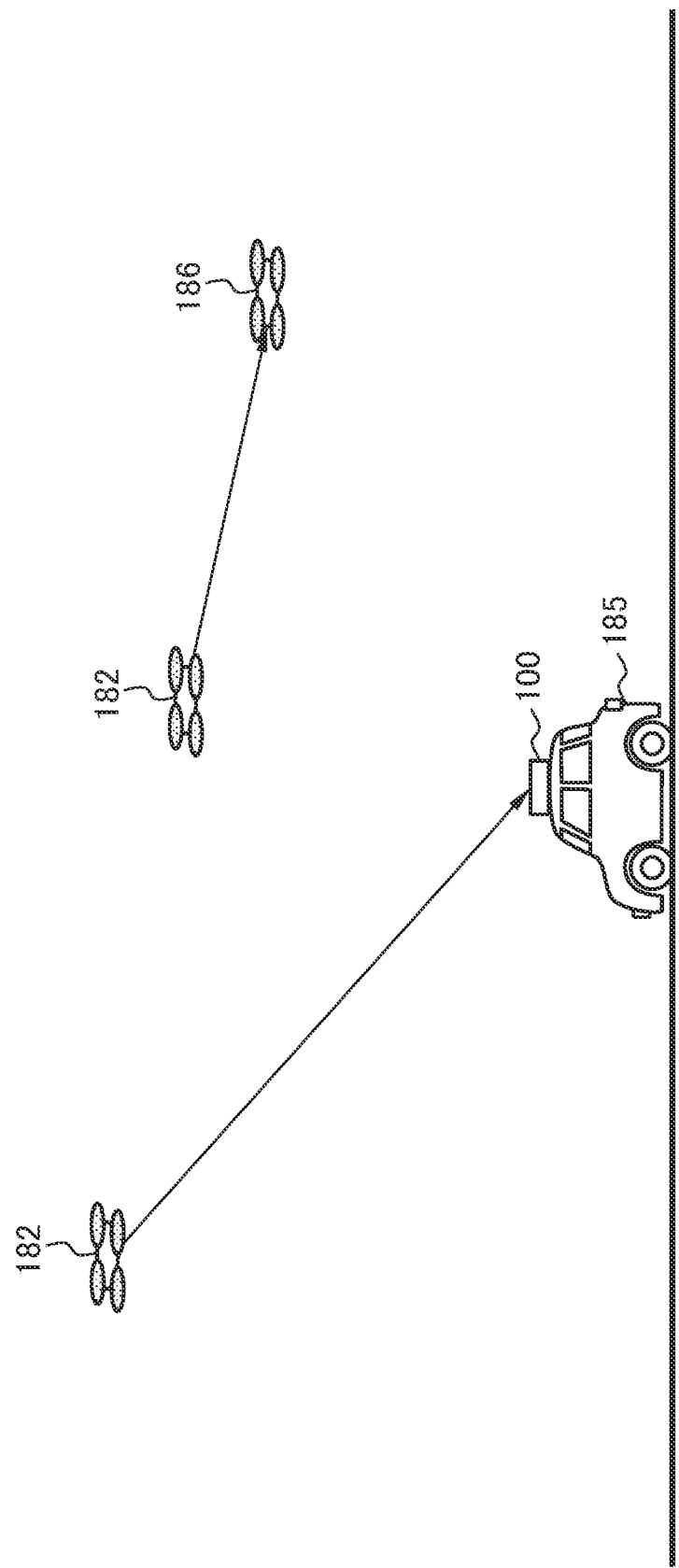

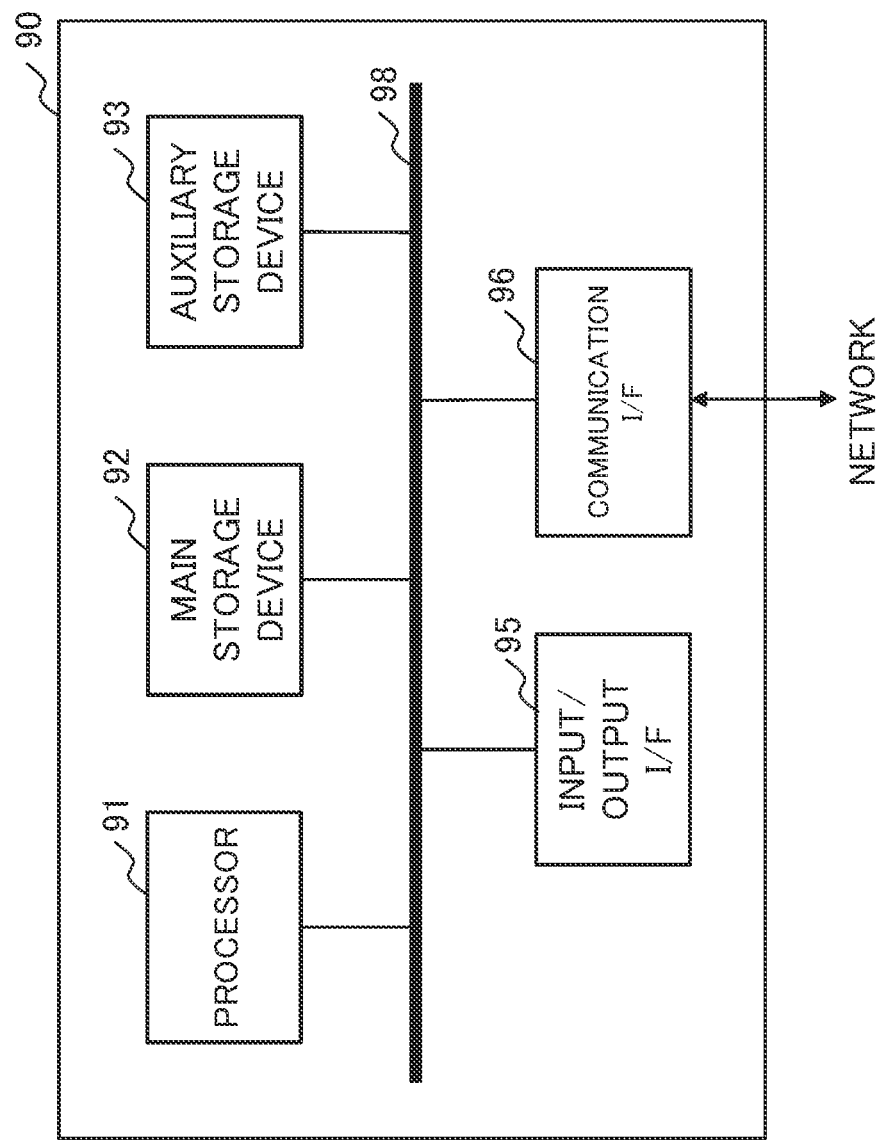

GAS DETECTION DEVICE, GAS DETECTION SYSTEM, AND GAS DETECTION METHOD

This application is a National Stage Entry of PCT/JP2020/041666 filed on Nov. 9, 2020, which claims priority from Japanese Patent Application 2019-219663 filed on Dec. 4, 2019, the contents of all of which are incorporated herein by reference, in their entirety.

TECHNICAL FIELD

The present invention relates to a gas detection device or the like that detects gas using laser light.

BACKGROUND ART

In plant such as petroleum refining, petrochemicals, chemical factories, and steelworks, and civil engineering and construction sites, many stationary gas sensors are disposed in order to detect gases that may be generated on site. Such a stationary gas sensor can detect only gas in a local space. For example, a gas generation source may not be specified in advance, or a space where the gas may be generated may be too wide. In such a case, a space that cannot be covered by the stationary gas sensor is generated. PTLs 1 and 2 disclose a technique for detecting a gas in a wide detection space using an infrared light laser.

PTL 1 discloses a gas detection optical device that detects a detection target gas in a detection space using infrared light. The device of PTL 1 includes a light source side unit that two-dimensionally scans the detection space with the infrared light laser, and a light receiving side unit that receives the infrared light laser emitted from the light source side unit.

PTL 2 discloses a gas detection method for visualizing and detecting a detection target gas having an absorption wavelength in an infrared region in a detection space. In the method of PTL 2, a retroreflective reflection surface member disposed in a detection space is irradiated with laser light, and reflected light of the laser light retroreflected in an irradiation direction of the laser light is received near a laser light source to detect intensity of an absorption wavelength.

CITATION LIST

Patent Literature

[PTL 1] JP 2018-087748 A
[PTL 2] JP 2018-185190 A

SUMMARY OF INVENTION

Technical Problem

According to the device of PTL 1, the detection target gas can be detected in the detection space between the light source side unit and the light receiving side unit. However, the device of PTL 1 can detect the detection target gas only in the detection space between the light source side unit and the light receiving side unit, and thus, the detection space is limited.

According to the method of PTL 2, the detection space can be expanded by rotating an optical unit with a pole as a rotation axis or moving the optical unit in parallel in a longitudinal direction of the pole. In the method of PTL 2, since the detection space is determined by a rotation angle of the optical unit and a length of the pole in the longitudinal direction, it is difficult to apply the method to detection of gas in a wide space such as a plant.

An object of the present invention is to provide a gas detection device and the like capable of detecting a detection target gas over a wide range without using a mechanism that operates mechanically.

Solution to Problem

A gas detection device of one aspect of the present invention including: a projector including a light source that emits laser light having a wavelength at which an absorption rate by a detection target gas is high and a spatial light modulator that modulates the laser light emitted from the light source; a projection control unit that controls projection light to be projected toward a retroreflector by causing the light source to emit the laser light and setting a pattern of a modulation part of the spatial light modulator; a light receiver that receives reflected light of the projection light reflected by the retroreflector and measures an intensity of the received reflected light; and a leakage determination unit that acquires the intensity of the reflected light from the light receiver and determines leakage of the detection target gas in a detection space with the retroreflector based on the intensity of the reflected light.

A gas detection method of one aspect of the present invention including: controlling a projector including a light source that emits laser light having a wavelength at which an absorption rate by a detection target gas is high and a spatial light modulator that modulates the laser light emitted from the light source to emit the laser light from the light source, and setting a pattern of a modulation part of the spatial light modulator to project projection light toward a retroreflector; acquiring an intensity of the reflected light received by a light receiver that receives the reflected light of the projection light reflected by the retroreflector; and determining leakage of the detection target gas in a detection space with the retroreflector based on the intensity of the reflected light.

Advantageous Effects of Invention

According to the present invention, it is possible to provide a gas detection device and the like capable of detecting a detection target gas over a wide range without using a mechanism that operates mechanically.

BRIEF DESCRIPTION OF DRAWINGS

FIG. 21 is a conceptual diagram for explaining still another example of Application Example 6 of the gas detection system according to the example embodiment.

FIG. 22 is a block diagram illustrating an example of a hardware configuration for achieving the control device of the gas detection system according to the example embodiment.

EXAMPLE EMBODIMENT

Figure 1:
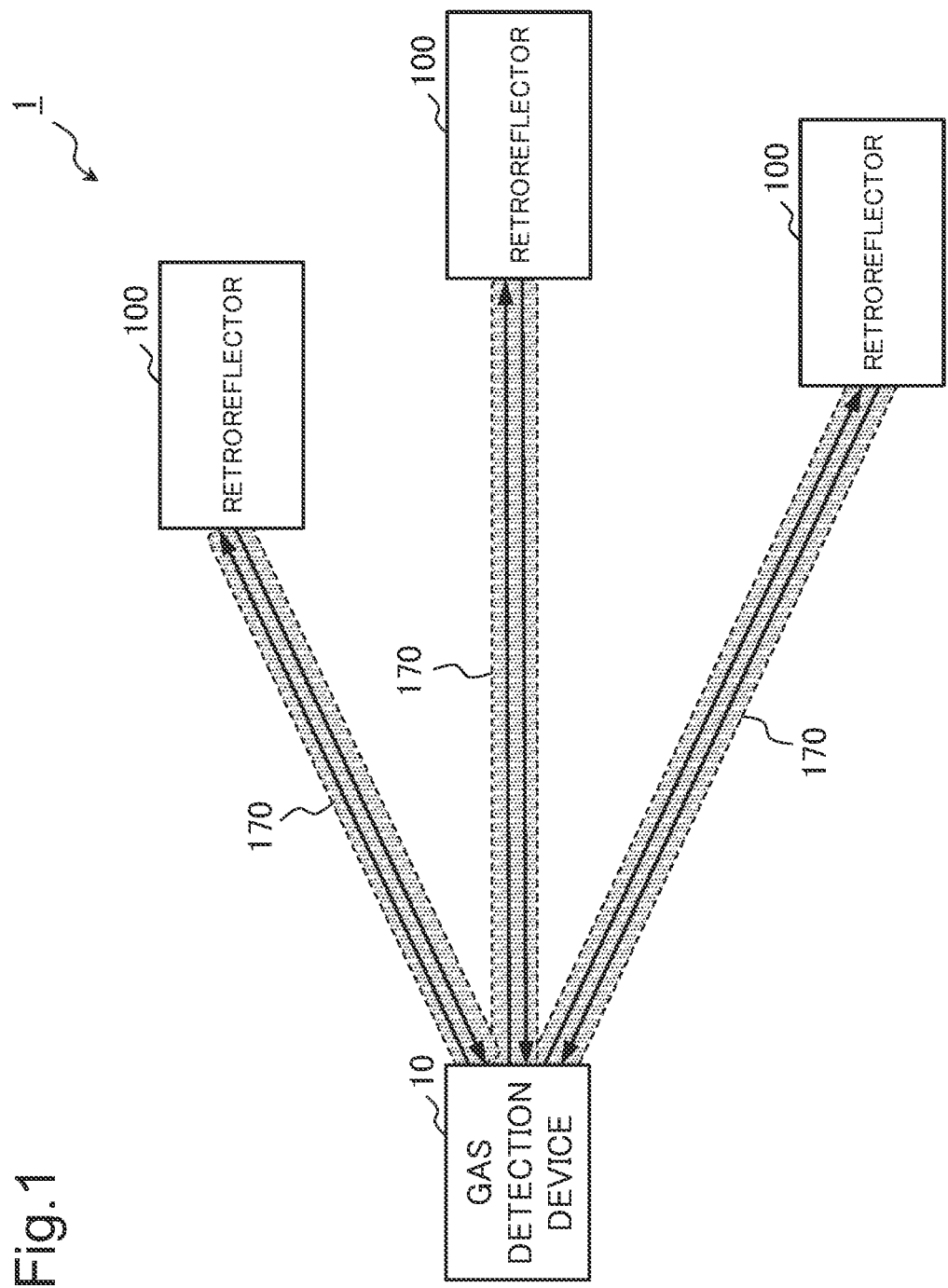
FIG. 1 is a conceptual diagram for explaining an example of a configuration of a gas detection system according to an example embodiment.

Hereinafter, an example embodiment of the present invention will be described with reference to the drawings. However, the example embodiment described below has technically preferable limitations for carrying out the present invention, but the scope of the invention is not limited to the following. In all the drawings used in the following description of the example embodiment, the same reference numerals are given to the same parts unless there is a particular reason. Further, in the following example embodiments, repeated description of similar configurations and operations may be omitted. In addition, the directions of the arrows in the drawings illustrate an example, and do not limit the directions of signals between blocks.

EXAMPLE EMBODIMENT

First, a gas detection system according to the example embodiment will be described with reference to the drawings. The gas detection system according to the present example embodiment irradiates a retroreflector with light in a wavelength region that is easily absorbed by a gas to be detected (hereinafter, referred to as a detection target gas). The gas detection system of the present example embodiment detects the detection target gas by measuring an intensity of laser light (hereinafter, referred to as retroreflective light) reflected by the retroreflector.

(Configuration)

FIG. 1 is a conceptual diagram for describing an outline of a configuration of a gas detection system 1 of the present example embodiment. The gas detection system 1 includes a gas detection device 10 and at least one retroreflector 100. A space on optical paths of the laser light and the retroreflective light between the gas detection device 10 and the retroreflector 100 is a detection space 170 capable of detecting the detection target gas. Note that although FIG. 1 illustrates an example in which the gas detection system 1 includes a plurality of retroreflectors 100, the gas detection system 1 may include one retroreflector 100. In the following description, the plurality of retroreflectors 100 may be treated as a single retroreflector.

The gas detection device 10 emits laser light in a wavelength region that is easily absorbed by the detection target gas toward the retroreflector 100. For example, the gas detection device 10 emits laser light having a wavelength in the infrared region that is absorbed based on vibration or rotational movement of molecules constituting the gas. For example, the gas detection device 10 emits laser light having a wavelength in an ultraviolet region or a visible region that is absorbed based on electronic transition of molecules constituting the gas. The wavelength of the laser light emitted from gas detection device 10 is voluntarily selected according to the detection target gas.

Here, an example of gases (substances) that can be detected by the gas detection device 10 using laser light having a wavelength in an infrared region (1 to 11 micrometers) will be listed.

For example, the gas detection device 10 detects the detection target gas using laser light having a wavelength in a 1 to 3 micrometer band (short wavelength region). For example, when the laser light having a wavelength in a short wavelength region is used, the gas detection device 10 can detect gases of substances such as methane, water, carbon monoxide, carbon dioxide, ammonia, acetylene, hydrogen sulfide, nitrous oxide, nitrogen monoxide, and hydrogen chloride.

For example, the gas detection device 10 detects the detection target gas using laser light having a wavelength in a 3 to 5 micrometer band (middle wavelength region). For example, when the laser light having a wavelength in a middle wavelength region is used, the gas detection device 10 can detect gases of substances such as benzene, butane gas, ethane, ethylbenzene, ethylene, heptane, hexane, isoprene, methyl ethyl ketone, and methane. For example, when the laser light having a wavelength in the middle wavelength region is used, gas detection device 10 can detect substances such as methanol, methyl isobutyl ketone, octane, pentane, pentane, propane, propylene, toluene, and xylene.

For example, the gas detection device 10 detects the detection target gas using laser light having a wavelength in a 10 to 11 micrometer band (long wavelength region). For example, when the laser light having the wavelength in the long wavelength region is used, the gas detection device 10 can detect gases of substances such as sulfur hexafluoride, anhydrous ammonia, ethyl cyanoacrylate, chlorine dioxide, acetic acid, Freon-12, ethylene, and methyl ethyl ketone. For example, by using the laser light having the wavelength in the long wavelength region, the gas detection device 10 can detect gases of substances such as acetyl chloride, allyl bromide, allyl chloride, allyl fluoride, methyl bromide, Freon-11, furan, hydrazine, methyl cyanol, and methyl vinyl ketone. For example, by using the laser light having the wavelength in the long wavelength region, the gas detection device 10 can detect substances such as propenal, propylene, tetrahydrofuran, trichloroethylene, uranyl fluoride, vinyl chloride, vinyl cyanide, and vinyl ether.

The above gas (substance) is an example, and the detection target gas of the gas detection device 10 is not limited to the above example. In addition, the wavelength of light easily absorbed by the substance depends on a characteristic absorption band of a functional group constituting the substance. Therefore, some substances characteristically absorb light in a plurality of wavelength bands, and the wavelength region of light that is easily absorbed by the substances is not limited to the above-described wavelength region. When the detection target gas characteristically absorbs light having a wavelength in the ultraviolet region or the visible region, the laser light having a wavelength in the ultraviolet region or the visible region may be used.

The gas detection device 10 includes a projector including a phase modulation-type spatial light modulator. The gas detection device 10 projects laser light on a modulation part of the spatial light modulator, and emits the laser light reflected by the modulation part. For example, the gas detection device 10 projects dotted, linear, or planar laser light. The gas detection device 10 can control an emission direction of the laser light by changing the pattern of the modulation part of the spatial light modulator. Therefore, the gas detection device 10 can change the emission direction of the laser light without providing a mechanical mechanism.

When the retroreflector 100 is disposed, the gas detection device 10 can detect the detection target gas in the plurality of detection spaces 170 by switching the emission direction of the laser light. That is, the gas detection device 10 can expand the substantial detection space 170 by switching the retroreflector 100 that emits the laser light.

When the position of the retroreflector 100 has not been identified, the gas detection device 10 executes calibration. There is a high possibility that the retroreflector 100 is located in a direction in which the emission direction of the laser light is scanned and the intensity of the retroreflective light reflected by the retroreflector 100 is maximized. Therefore, the gas detection device 10 specifies that the retroreflector 100 is present in the direction in which the retroreflective light is maximized or maximum when scanning is performed in the emission direction of the laser light. A detailed configuration of the gas detection device 10 will be described later.

The gas detection device 10 receives the retroreflective light reflected by the retroreflector 100. For example, the gas detection device 10 includes a light receiver including a light receiving element such as a photodiode, a phototransistor, an avalanche photodiode, a photoconductive cell, an image sensor, a photoelectric tube, a photomultiplier tube, a radiation thermocouple, a thermopile, or a pyroelectric detector. The light receiver included in the gas detection device 10 is disposed close to an emission unit of the laser light. Note that the light receiving element described here is an example, and the light receiver included in the gas detection device 10 is not limited thereto.

The gas detection device 10 measures a concentration of the detection target gas in the detection space 170 based on the intensity of the emitted laser light and the intensity of the retroreflective light obtained by reflecting the laser light by the retroreflector 100. That is, the gas detection device 10 measures the concentration of the detection target gas in the detection space 170 according to a degree of attenuation of the intensity of the laser light. For example, the concentration of the detection target gas in the detection space 170 is obtained using the Lambert's law or the Bale's law.

For example, the gas detection device 10 can measure the concentration of the detection target gas in the detection space 170 based on the distance between the gas detection device 10 and the retroreflector 100. A distance 2L that is twice the distance L between the gas detection device 10 and the retroreflector 100 corresponds to the stroke of the laser light (L is a positive real number). Assuming that the intensity of the laser light emitted from the gas detection device 10 is $I_L$ and the intensity of the retroreflective light received by the gas detection device 10 is $I_R$, the concentration $c_g$ of the detection target gas in the detection space 170 can be calculated by the following Equation 1 ($I_L$, $I_R$, $c_g$ are positive real numbers).

$$c_g = \frac{-\log_{10}(I_R/I_L)}{\varepsilon \times 2L} \qquad (1)$$

In Equation 1, $\varepsilon$ is a molar absorption coefficient of the detection target gas ($\varepsilon$ is a real number). The above Equation 1 is a calculation equation that is established when it is assumed that there is no reflection on a surface of a medium and no scattering inside and on the surface of the medium.

Actually, since components other than the detection target gas are included in the detection space 170, it is necessary to consider attenuation due to components other than the detection target gas. Therefore, before shipping the gas detection system 1, it is desirable to change the concentration of the detection target gas in the detection space 170 close to the actual use condition and verify how the laser light attenuates according to the concentration of the detection target gas. In addition, since the attenuation of the laser light is affected by a distance between the gas detection device 10 and the retroreflector 100, it is desirable to set the distance between the gas detection device 10 and the retroreflector 100 in several ways and verify the change in the concentration of the detection target gas in the detection space 170.

For example, an experimental equation for obtaining the concentration $c_g$ of the detection target gas in the detection space 170 is set as the following Equation 2.

$$c_g = \frac{-\log_{10}(I_R/I_L)}{2L} \times k \qquad (2)$$

In Equation 2, k is an experimentally obtained coefficient (k is a real number). Equation 2 described above is an example, and is not limited to the equation used by the gas detection device 10 when calculating the concentration $c_g$ of the detection target gas in the detection space 170.

In practice, the distance between the gas detection device 10 and the retroreflector 100 and the state of the detection space 170 are different depending on the use environment, and thus, calibration is necessary when installing the gas detection device 10. For example, in a case where the distance between the gas detection device 10 and the retroreflector 100 is known in advance, an experimental equation to be used according to the distance may be set for each retroreflector 100, and calibration may be executed for each retroreflector 100. At the time of calibration, the concentration of the detection target gas in the detection space 170 may be regarded as 0 according to the installation environment of the retroreflector 100, and a preset experimental equation may be set. In addition, in a case where the distance between the gas detection device 10 and the retroreflector 100 is changed, a distance meter may be provided in the gas detection device 10, the experimental equation according to the distance between the gas detection device 10 and the retroreflector 100 may be selected, and the calibration may be executed using the selected experimental equation.

In addition, a camera (not illustrated) may be mounted on the gas detection device 10. When the retroreflector 100 is detected from the image captured by the camera and projection light is projected toward the detected retroreflector 100, calibration and distance measurement using laser light may be omitted. In a case where the retroreflector 100 is detected by the camera, it is easy to detect the retroreflector 100 by devising to facilitate understanding of the presence of the retroreflector 100. For example, when the retroreflector 100 is surrounded by a frame or a pattern is drawn on the retroreflector 100 or the periphery thereof to mark the retroreflector, the retroreflector 100 can be easily detected.

The gas detection device 10 performs leakage determination of the detection target gas based on the concentration $c_g$ of the detection target gas detected in the detection space 170. The gas detection device 10 determines that there is leakage of the detection target gas when the concentration $c_g$ of the detection target gas in the detection space 170 exceeds a preset detection threshold DT. In addition, the attenuation of the laser light is affected by the temperature and humidity of the detection space 170. Therefore, the gas detection device 10 may determine that there is leakage of the detection target gas when the concentration $c_g$ of the detection target gas in the detection space 170 exceeds the detection threshold DT for the predetermined period P set in advance. The gas detection device 10 outputs a determination result regarding leakage of the detection target gas in the detection space 170.

The retroreflector 100 has a reflection surface that retroreflects light incident from a certain direction along an incident direction of the light. The retroreflector 100 is irradiated with the laser light emitted from the gas detection device 10. The retroreflector 100 retroreflects the emitted laser light toward the gas detection device 10. In practice, the retroreflector 100 does not retroreflect the emitted laser light toward the gas detection device 10, but reflects the laser light with directivity in a certain angular range. The reflection surface of the retroreflector 100 may be a flat surface or a curved surface. When the reflection surface of the retroreflector 100 is a curved surface, retroreflectivity in a certain angle range can be obtained in the entire reflection surface.

Figure 2:
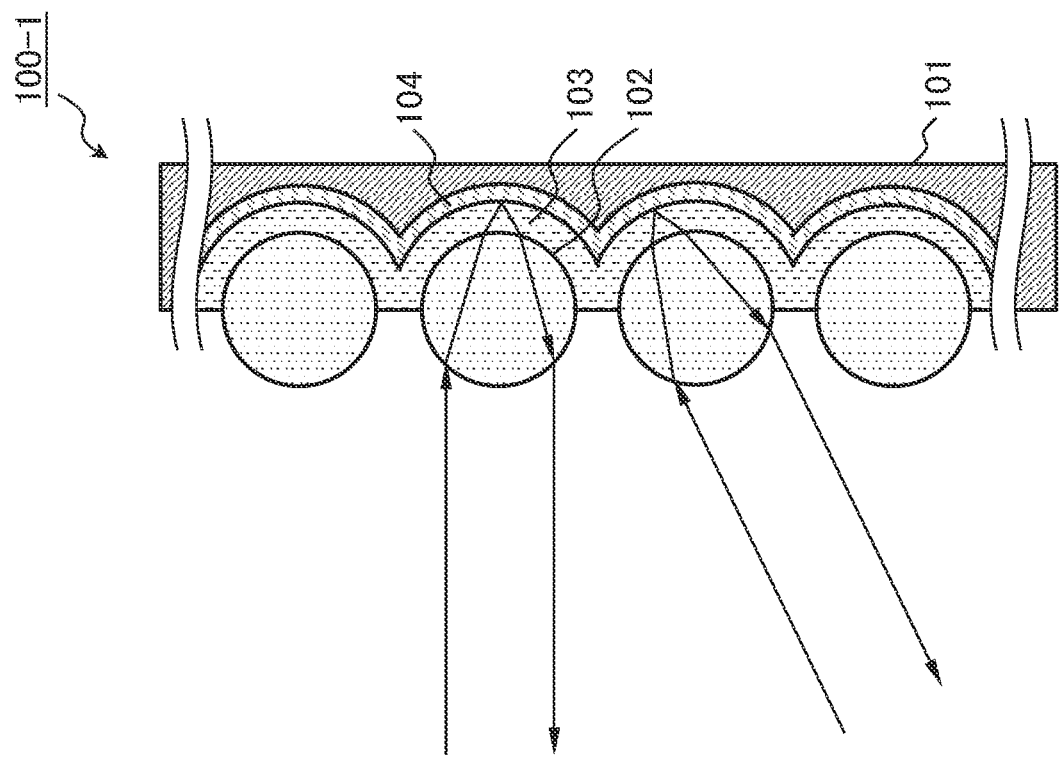
FIG. 2 is a cross-sectional view of an example of a retroreflector included in the gas detection system according to the example embodiment.

FIG. 2 is a cross-sectional view conceptually illustrating an example (retroreflector 100-1) of the retroreflector 100. A plurality of spherical beads 102 having a high refractive index is disposed on one surface (hereinafter, referred to as an incident surface) of a base material 101 of the retroreflector 100-1. For example, the spherical beads 102 are glass beads having a refractive index larger than that of general glass. A focal layer 103 in which light incident from the incident surface side is focused is disposed on the back side of the plurality of spherical beads 102 disposed on the incident surface of the retroreflector 100-1. A reflection layer 104 for reflecting light focused on the focal layer 103 is disposed on the back side of the focal layer 103. For example, the reflection layer 104 can be formed by depositing metal such as aluminum on the incident surface side of the base material 101.

The laser light incident from the incident surface of the retroreflector 100 is refracted by the surface (incident surface side) of the spherical bead 102 and travels inside the spherical bead 102. The light reaching the back surface (the focal layer 103 side) of the spherical bead 102 is refracted by the back surface of the spherical bead 102 and focused in the focal layer 103. When the light focused on the focal layer 103 is reflected by the reflection layer 104 and reaches the back surface of the spherical bead 102, the light is refracted by the back surface and travels inside the spherical bead 102. The light that has reached the surface (incident surface side) of the spherical bead 102 is refracted by the surface and emitted in the laser emission direction as the retroreflective light.

Figure 3:
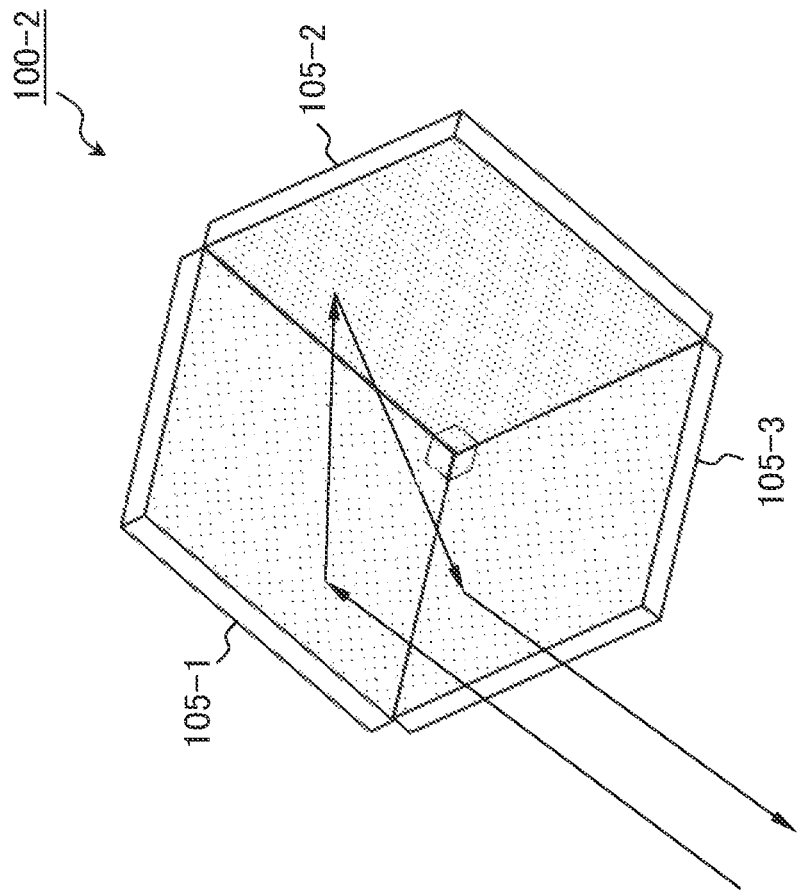
FIG. 3 is a conceptual diagram of another example of a retroreflector included in the gas detection system according to the example embodiment.

FIG. 3 is a conceptual diagram illustrating another example (retroreflector 100-2) of the retroreflector 100. The retroreflector 100-2 has a structure in which three plane mirrors are combined so as to share one right angle with their reflection surfaces facing inward. In the example of FIG. 3, the retroreflector 100-2 has a structure in which a reflecting mirror 105-1, a reflecting mirror 105-2, and a reflecting mirror 105-3 share one right angle with their reflection surfaces facing inward. FIG. 3 illustrates an example in which the light reflected by a reflection surface of the reflecting mirror 105-1 is reflected by a reflection surface of the reflecting mirror 105-2, reaches a reflection surface of the reflecting mirror 105-3, is further reflected by a reflection surface of the reflecting mirror 105-3, and is reflected toward the incident direction. For example, the retroreflector 100-2 has a structure in which a plurality of fine corner cube-like uneven structures on the order of micrometers are laid.

The outline of the configuration of the gas detection system 1 of the example embodiment has been described above. FIGS. 1 to 3 are merely examples, and do not limit the configuration of the gas detection system 1 of the example embodiment.

[Gas Detection Device]

Figure 4:
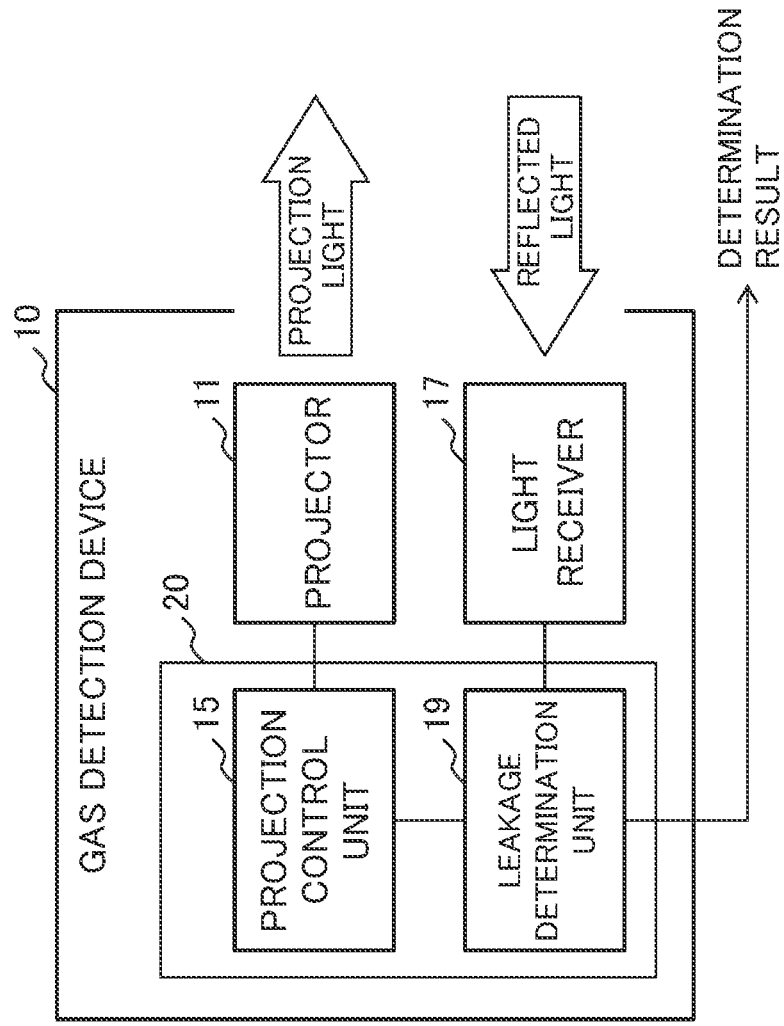
FIG. 4 is a conceptual diagram for explaining an example of a configuration of a gas detection device included in the gas detection system according to the example embodiment.

Next, a configuration of the gas detection device 10 included in the gas detection system 1 will be described with reference to the drawings. FIG. 4 is a block diagram for explaining the configuration of the gas detection device 10. The gas detection device 10 includes a projector 11, a projection control unit 15, a light receiver 17, and a leakage determination unit 19. Note that the projection control unit 15 and the leakage determination unit 19 may be achieved by a single configuration (control device 20).

The projector 11 is connected to the projection control unit 15. The projector 11 is a projector including a phase modulation-type spatial light modulator. The projector 11 projects the laser light (also referred to as projection light) toward the retroreflector 100 under the control of the projection control unit 15.

The projection control unit 15 is connected to the projector 11 and the leakage determination unit 19. The projection control unit 15 acquires the position of the retroreflector 100 from the leakage determination unit 19. The projection control unit 15 controls the projector 11 to project the projection light toward the retroreflector 100.

When receiving a calibration instruction from the leakage determination unit 19, the projection control unit 15 controls the projector 11 to project the projection light while changing the projection direction. The projection control unit 15 acquires the time at which the intensity of the reflected light becomes maximum or minimum from the leakage determination unit 19. The projection control unit 15 controls the projector 11 to project the laser light toward the projection direction in which the laser light has been projected at the time when the intensity of the reflected light becomes maximum or minimum.

When receiving the distance measurement instruction from the leakage determination unit 19, the projection control unit 15 controls the projector 11 to project projection light for distance measurement. The projection control unit 15 acquires the distance between the gas detection device 10 and the retroreflector 100 from the leakage determination unit 19. The projection control unit 15 controls the projector 11 such that the laser light having the intensity, the projection direction, and the projection angle according to a distance between the gas detection device 10 and the retroreflector 100 is projected.

The light receiver 17 is connected to the leakage determination unit 19. The light receiver 17 receives the retroreflective light (also referred to as reflected light) reflected by the retroreflector 100. The light receiver 17 measures the intensity of the received reflected light and transmits a signal (hereinafter, also referred to as a reflected light intensity signal) corresponding to the measured intensity of the reflected light to the leakage determination unit 19.

The leakage determination unit 19 is connected to the light receiver 17. The leakage determination unit 19 receives the reflected light intensity signal from the light receiver 17. The leakage determination unit 19 calculates the concentration of the detection target gas in the detection space 170 based on the received reflected light intensity signal. The leakage determination unit 19 determines whether a gas leakage occurs in the detection space 170 based on the calculated concentration of the detection target gas.

At the time of calibration, the leakage determination unit 19 specifies a projection direction in which the intensity of the reflected light obtained by reflecting the projection light projected from the projector 11 by the retroreflector 100 is maximized or maximum under the control of the projection control unit 15. The leakage determination unit 19 outputs the specified projection direction to the projection control unit 15.

At the time of distance measurement, the leakage determination unit 19 calculates the distance between the gas detection device 10 and the retroreflector 100 based on the time when the projection light is projected from the projector 11 under the control of the projection control unit 15 and the time when the reflected light of the projection light is received by the light receiver 17. The leakage determination unit 19 outputs the calculated distance to the projection control unit 15.

For example, the leakage determination unit 19 changes the intensity of the laser light projected from the projection control unit 15 according to the calculated distance. When the distance between the gas detection device 10 and the retroreflector 100 is large, the laser light is easily attenuated in the detection space 170 between the gas detection device 10 and the retroreflector 100. Therefore, when the intensity of the laser light increases as the distance between the gas detection device 10 and the retroreflector 100 increases, the attenuation of the laser light in the detection space 170 is easily made constant.

Furthermore, for example, the leakage determination unit 19 changes the projection direction and the projection angle of the laser light projected from the projection control unit 15 according to the calculated distance. When the distance between the gas detection device 10 and the retroreflector 100 is large, the laser light projected from the gas detection device 10 is less likely to hit the retroreflector 100. Therefore, when the projection direction of the laser light is caused to follow the retroreflector 100 or the projection angle of the laser light increases, the laser light easily hits the retroreflector 100.

When the relative positional relationship between the gas detection device 10 and the retroreflector 100 is changed, an attenuation rate of the laser light in the detection space 170 fluctuates according to the change in the distance between the gas detection device 10 and the retroreflector 100. For example, the attenuation rate in a situation where there is no detection target gas is stored in advance in the leakage determination unit 19 in association with a stroke distance of the laser light. In this way, the leakage determination unit 19 can more accurately calculate the concentration of the detection target gas in the detection space 170 by correcting the attenuation rate associated to the measured distance.

The leakage determination unit 19 outputs a determination result. For example, the leakage determination unit 19 outputs a determination result to a system (not illustrated) that uses the determination result. Furthermore, for example, the leakage determination unit 19 outputs a determination result to a display device (not illustrated) that displays the determination result, and causes the display device to display the determination result.

Figure 5:
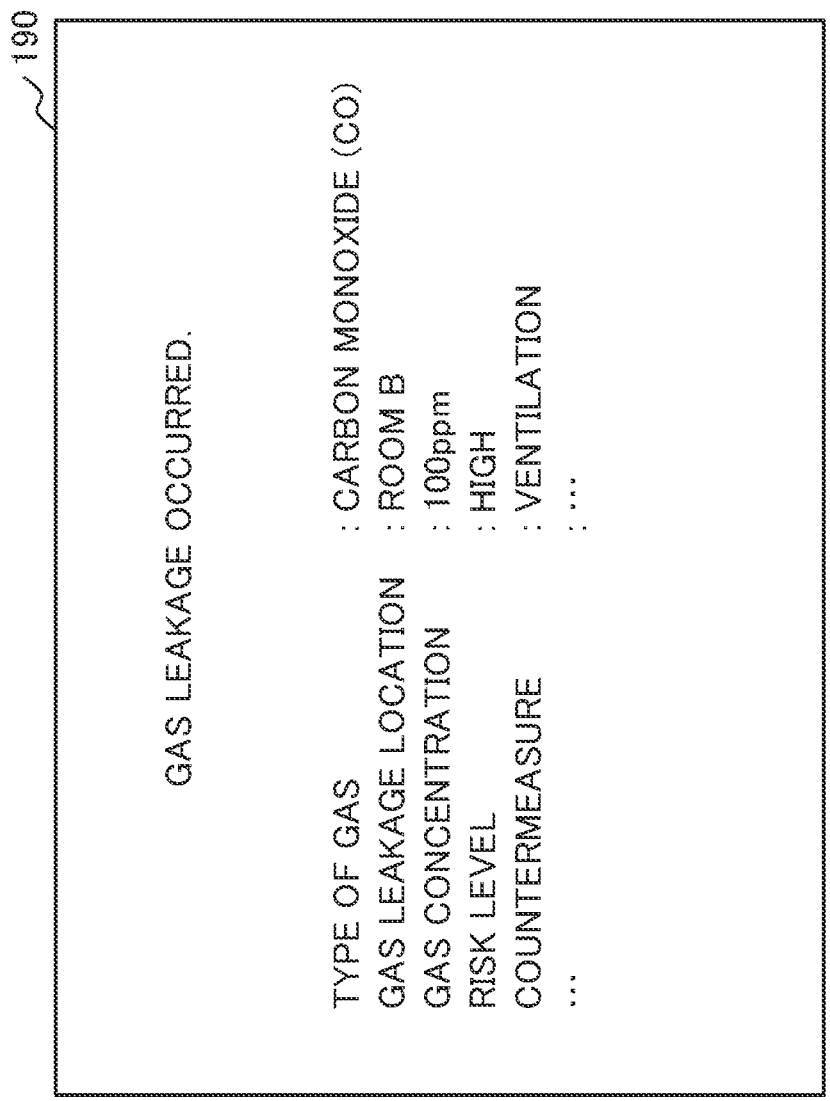
FIG. 5 is a conceptual diagram illustrating an example in which a determination result by the gas detection device included in the gas detection system according to the example embodiment is displayed on a display device.

FIG. 5 is a conceptual diagram illustrating an example of a determination result displayed on the display device 190 by the leakage determination unit 19. In the example of FIG. 5, when detecting gas leakage of the detection target gas, the leakage determination unit 19 causes the display device 190 to display a determination result of "gas leakage occurred.". In the example of FIG. 5, accompanying information associated with the determination result such as a type of gas leaking, a gas leakage location, a gas concentration, a risk level, and a countermeasure is displayed on the display device 190. In addition, at a site where gas leakage may occur, not only the determination result but also an alarm based on the determination result may be issued to urge a worker to evacuate. Note that the example of FIG. 5 is an example, and does not limit the determination result or accompanying action that the leakage determination unit 19 causes the display device 190 to display.

The configuration of the gas detection device 10 is described above. Note that FIG. 4 is an example and does not limit the configuration of the gas detection device 10.

[Projector]

Figure 6:
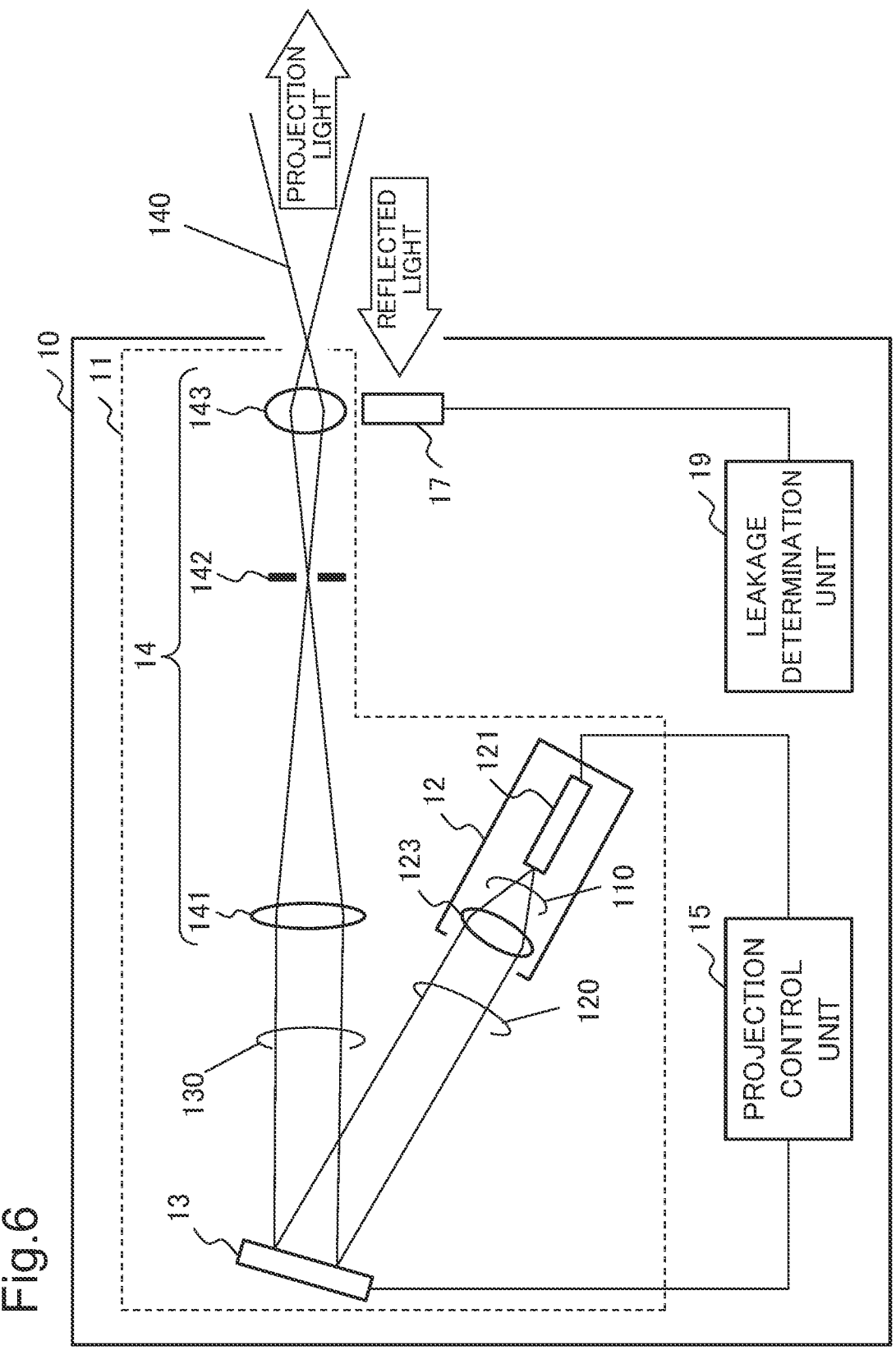
FIG. 6 is a conceptual diagram illustrating an example of a configuration of a projector included in the gas detection device included in the gas detection system according to the example embodiment.

Next, a configuration of the projector 11 included in the gas detection device 10 will be described with reference to the drawings. FIG. 6 is a conceptual diagram illustrating an example of a configuration of the projector 11. As illustrated in FIG. 6, the projector 11 includes a light source 12, a spatial light modulator 13, and a projection optical system 14. Note that FIG. 6 is conceptual, and does not accurately represent a positional relationship between the components, a light irradiation direction, and the like.

As illustrated in FIG. 6, the light source 12 is connected to the projection control unit 15. The light source 12 includes a laser emitter 121 that emits laser light 110 having a specific wavelength, and a collimator 123 that converts the laser light 110 emitted from the laser emitter 121 into parallel light 120. The laser emitter 121 emits the laser light 110 having a specific wavelength for detecting the detection target gas under the control of the projection control unit 15. The laser light 110 emitted from the laser emitter 121 is converted into the parallel light 120 by the collimator 123, and is incident on the plane of the modulation part of the spatial light modulator 13. For example, the laser emitter 121 may be configured to emit light having a wavelength in a visible region, or may be configured to emit light having a wavelength other than the visible region such as an infrared region or an ultraviolet region. In addition, the laser emitter 121 may be replaced with a light emitting diode or a super luminescent diode that emits light other than the laser light as long as it can emit light having a uniform wavefront.

As illustrated in FIG. 6, in the example embodiment, the incident angle of the parallel light 120 is made non-perpendicular to the modulation part of the spatial light modulator 13. That is, in the example embodiment, an emission axis of the parallel light 120 emitted from the light source 12 is inclined with respect to the modulation part of the spatial light modulator 13. When the emission axis of the parallel light 120 is set obliquely with respect to the modulation part of the spatial light modulator 13, the parallel light 120 can be incident on the modulation part of the spatial light modulator 13 without using a beam splitter, and thus, the utilization efficiency of light can be improved. In addition, when the emission axis of the parallel light 120 is set obliquely with respect to the modulation part of the spatial light modulator 13, the size of the optical system of the projector 11 can be made compact.

The spatial light modulator 13 is connected to the projection control unit 15. The spatial light modulator 13 includes a modulation part. In the modulation part of the spatial light modulator 13, a pattern for displaying a desired image on a projection target surface is set.

The spatial light modulator 13 sets a pattern for displaying a desired image on the projection target surface in the modulation part according to the control of the projection control unit 15. The modulation part of the spatial light modulator 13 is irradiated with the parallel light 120 in a state where a pattern for displaying a desired image is set. Reflected light (modulated light 130) of the parallel light 120 emitted to the modulation part of the spatial light modulator 13 travels toward the projection optical system 14.

In the modulation part of the spatial light modulator 13, a plurality of reflection regions (corresponding to pixels) capable of changing optical characteristics such as a refractive index is arranged in an array. The spatial light modulator 13 can set a pattern for displaying a desired image on the projection target surface in the modulation part by controlling the optical characteristics of each pixel of the modulation part. When light is emitted in a state where a pattern is set in the modulation part of the spatial light modulator 13, modulated light in which a spatial distribution is modulated according to an optical characteristic of a reflection portion is emitted. For example, a modulator that modulates a spatial distribution such as a phase, an amplitude, an intensity, a polarization state, a propagation direction, and the like of light can be used as the spatial light modulator 13.

For example, the spatial light modulator 13 can be achieved by a phase modulation-type spatial light modulator that modulates the phase of the incident parallel light 120. Hereinafter, an example of using the phase modulation-type spatial light modulator 13 will be described.

A phase image corresponding to an image to be displayed on the projection target surface is set in the modulation part of the phase modulation-type spatial light modulator 13. The phase image is a pattern in which a phase distribution corresponding to an image to be displayed on the projection target surface is disposed in a tile shape. In this case, the modulated light 130 reflected by the modulation part of the spatial light modulator 13 becomes an image in which a kind of diffraction grating forms an aggregate, and an image is formed such that light diffracted by the diffraction grating gathers.

For example, the spatial light modulator 13 is achieved by a spatial light modulator using ferroelectric liquid crystal, homogeneous liquid crystal, vertical alignment liquid crystal, or the like. Specifically, the spatial light modulator 13 can be achieved by liquid crystal on silicon (LCOS).

For example, the spatial light modulator 13 may be achieved by a micro electro mechanical system (MEMS). Examples of the MEMS that achieves the spatial light modulator 13 include a two-dimensional MEMS and a one-dimensional MEMS. When laser light in an ultraviolet region or an infrared region is emitted, MEMS may be more suitable than LCOS.

Figure 7:
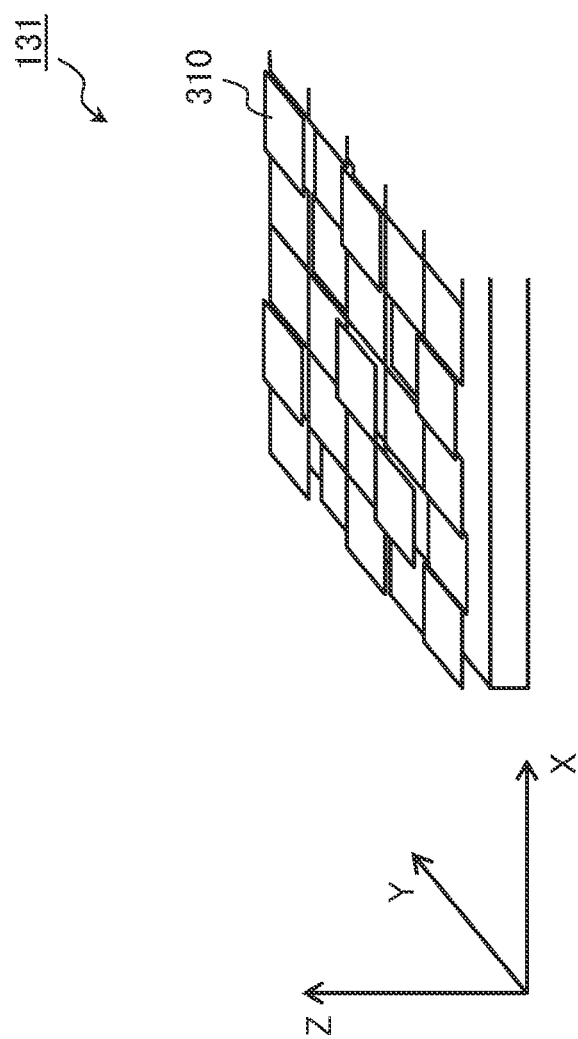
FIG. 7 is a conceptual diagram for explaining a two-dimensional micro electro mechanical systems (MEMS) that achieves a spatial light modulator of a projector included in the gas detection device included in the gas detection system according to the example embodiment.

FIG. 7 is a conceptual diagram illustrating an example (MEMS 131) of the two-dimensional MEMS. The MEMS 131 has a structure in which a plurality of small mirrors 310 is disposed in a lattice pattern for each pixel on a surface that modulates the laser light. In the MEMS 131, a height of each of the plurality of small mirrors 310 is displaced in the Z direction.

Figure 8:
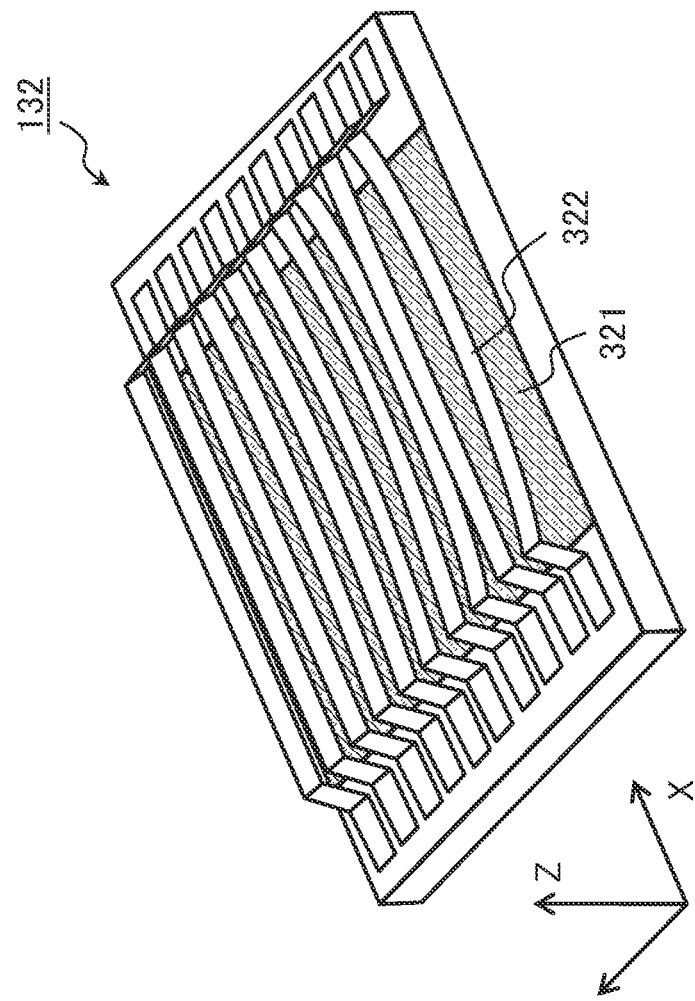
FIG. 8 is a conceptual diagram for describing a one-dimensional MEMS that achieves the spatial light modulator of the projector included in the gas detection device included in the gas detection system according to the example embodiment.

FIG. 8 is a conceptual diagram illustrating an example (MEMS 132) of the one-dimensional MEMS. The MEMS 132 includes a grounded ground surface 321 and a plurality of ribbon-shaped electrodes 322 extending in parallel across the ground surface 321. In the MEMS 132, the gap between each of the plurality of ribbon-shaped electrodes 322 and the ground surface 321 is displaced in the Z direction by controlling the voltage applied to each of the plurality of ribbon-shaped electrodes 322. In the case of using the MEMS 132, a mechanical mechanism for changing the inclination of the reflection surface (XY plane) is required in order to change the projection direction of the projection light.

By using the phase modulation-type spatial light modulator 13, energy can be concentrated on a portion of an image by sequentially switching a region where projection light is projected. Therefore, when the phase modulation-type spatial light modulator 13 is used, if the outputs of the light sources are the same, it is possible to display an image brighter than a method of projecting light onto the entire display area.

The projection optical system 14 is an optical system that projects the modulated light 130 modulated by the spatial light modulator 13 as projection light 140. The modulated light 130 is projected as projection light 140 by projection optical system 14. As illustrated in FIG. 6, the projection optical system 14 includes a Fourier transform lens 141, an aperture 142, and a projection lens 143.

The Fourier transform lens 141 is an optical lens that forms an image formed when the reflected light (modulated light 130) reflected by the modulation part of the spatial light modulator 13 is projected at infinity at a near focal position. In the example of FIG. 6, a focal point is formed at the position of the aperture 142.

The aperture 142 has a function of shielding high-order light included in the light focused by the Fourier transform lens 141 and specifying a display area. An opening portion of the aperture 142 is open smaller than an outer periphery of a display area at the position of the aperture 142, and is installed so as to block a peripheral area of the image at the position of the aperture 142. For example, the opening portion of the aperture 142 is formed in a rectangular shape or a circular shape. The aperture 142 is preferably installed at a focal position of the Fourier transform lens 141. Note that the aperture 142 may be shifted from the focal position as long as high order light can be shielded and the display area can be specified.

The projection lens 143 is an optical lens that enlarges and projects the light focused by the Fourier transform lens 141. The projection lens 143 projects the projection light 140 such that an image corresponding to the phase distribution set in the modulation part of the spatial light modulator 13 is formed on the projection target surface.

Figure 9:
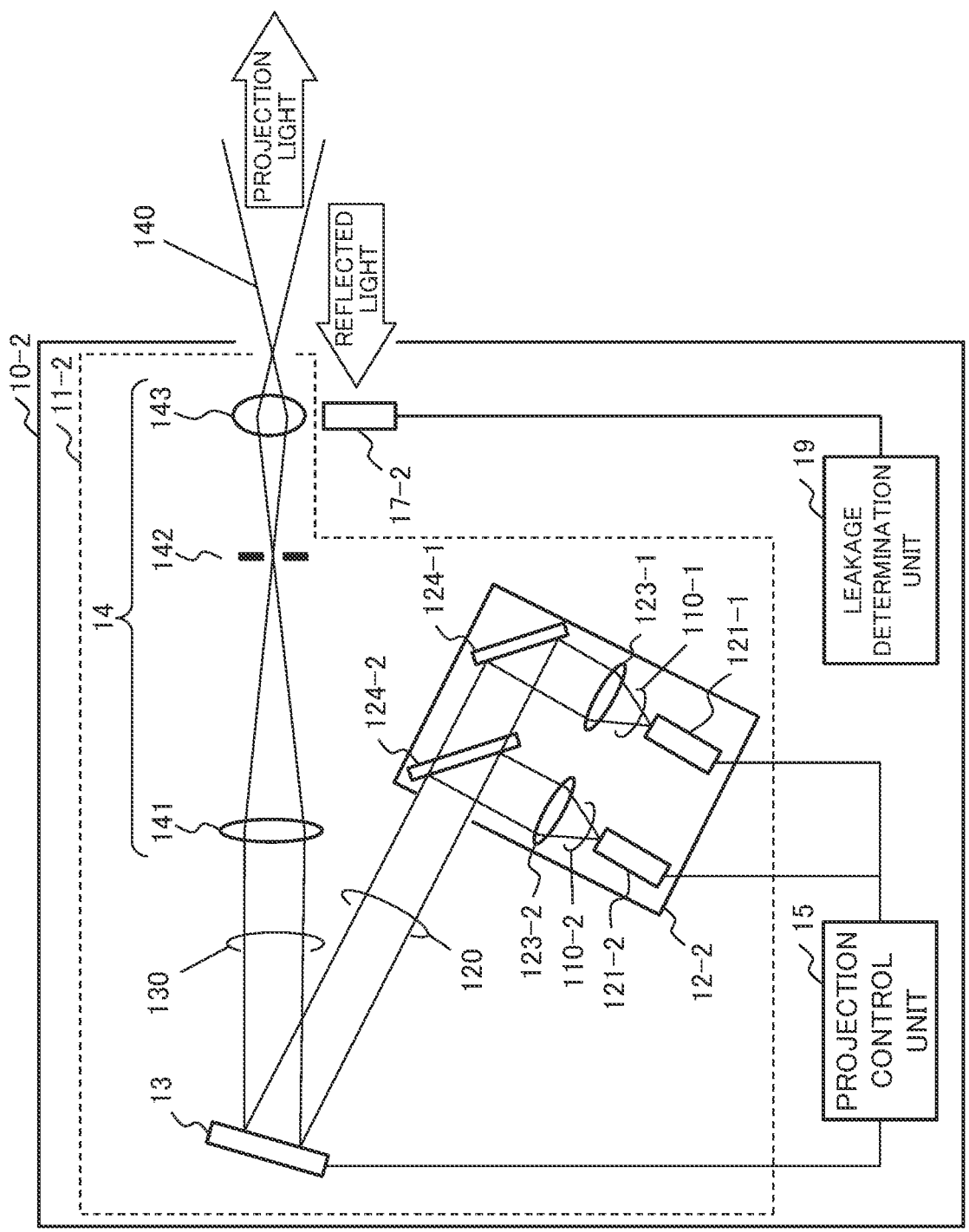
FIG. 9 is a conceptual diagram illustrating a modification of the configuration of the projector included in the gas detection device included in the gas detection system according to the example embodiment.

The gas detection system 1 can also be configured to emit laser light having a plurality of wavelengths. FIG. 9 is a conceptual diagram illustrating an example of a configuration of a gas detection device 10-2 that emits the laser light having a plurality of wavelengths. The gas detection device 10-2 includes a projection device 11-2 including a light source 12-2 that emits the laser light in a plurality of wavelength regions, and a light receiver 17-2 capable of receiving the laser light in the plurality of wavelength regions. Note that the projection control unit 15 and the leakage determination unit 19 of the gas detection device 10-2 are similar to the gas detection device 10 except that the projection control unit and the leakage determination unit correspond to the laser light in a plurality of wavelength regions, and thus, are denoted by the same reference numerals as the gas detection device 10, and a detailed description thereof will be omitted.

The light source 12-2 includes a laser emitter 121-1, a collimator 123-1, a mirror 124-1, a laser emitter 121-2, a collimator 123-2, and a dichroic mirror 124-2. FIG. 9 illustrates an example in which light of two colors is emitted using two laser light sources (laser emitter 121-1 and laser emitter 121-2). The light source 12-2 may be configured to emit light of three or more colors using three or more laser light sources.

The laser emitter 121-1 emits laser light 110-1 in a first wavelength region. The laser light 110-1 emitted from the laser emitter 121-1 passes through the collimator 123-1 and becomes coherent light. The light having passed through the collimator 123-1 is reflected by the reflection surface of the mirror 124-1 and travels toward the dichroic mirror 124-2. The parallel light 120 that has reached the dichroic mirror 124-2 passes through the dichroic mirror 124-2 and travels toward the modulation part of the spatial light modulator 13.

The laser emitter 121-2 emits laser light 110-2 in the second wavelength region. The laser light 110-2 emitted from the laser emitter 121-2 passes through the collimator 123-2 and becomes coherent light. The light having passed through the collimator 123-2 is reflected by the reflection surface of the dichroic mirror 124-2. The parallel light 120 reflected by the reflection surface of the dichroic mirror 124-2 travels toward the modulation part of the spatial light modulator 13.

The light source 12-2 emits the parallel light 120 emitted from at least one of the laser emitter 121-1 and the laser emitter 121-2 toward the modulation part of the spatial light modulator 13. For example, the light source 12-2 switches and emits light of the first wavelength region from the laser emitter 121-1 and light of the second wavelength region from the laser emitter 121-2 according to the control of the projection control unit 15. Note that the light source 12-2 may be configured to simultaneously emit the light of the first wavelength region from the laser emitter 121-1 and the light of the second wavelength region from the laser emitter 121-2.

The light receiver 17-2 receives reflected light of a plurality of wavelength regions. The light receiver 17-2 preferably covers a wide wavelength region in order to correspond to the detection target gas that selectively absorbs each laser light in the plurality of wavelength regions. Preferably, the light receiver 17-2 can deal with a plurality of wavelength regions. Furthermore, the light receiver 17-2 may combine light receivers having different detectable wavelength regions. The light receiver 17-2 receives each reflected light of the plurality of wavelength regions, and measures the intensity of the received reflected light of each of the wavelength regions.

According to the gas detection device 10-2 of FIG. 9, since the laser light having different wavelengths can be emitted, a plurality of gases having different absorption wavelengths can be detected.

The configuration of the projector 11 included in the gas detection device 10 is described above. Note that FIGS. 6 to 9 are examples, and do not limit the configuration of the projector 11.

[Projection Control Unit]

Figure 10:
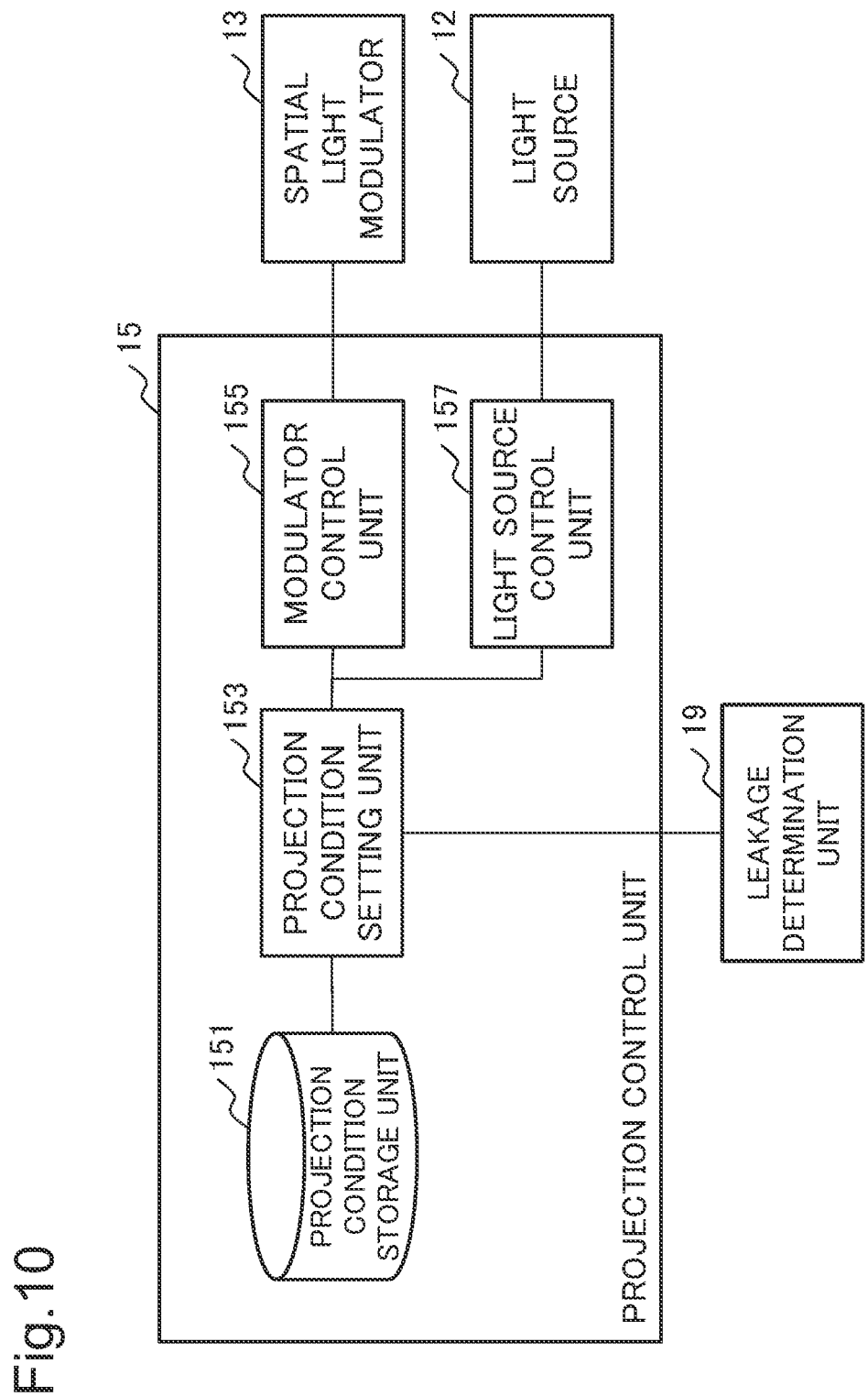
FIG. 10 is a block diagram illustrating an example of a configuration of a projection control unit included in the gas detection device included in the gas detection system according to the example embodiment.

Next, a configuration of the projection control unit 15 included in the gas detection device 10 will be described with reference to the drawings. FIG. 10 is a block diagram illustrating an example of a configuration of the projection control unit 15. The projection control unit 15 includes a projection condition storage unit 151, a projection condition setting unit 153, a modulator control unit 155, and a light source control unit 157.

The projection condition storage unit 151 is connected to the projection condition setting unit 153. The projection condition storage unit 151 stores a pattern corresponding to the projection light 140. In the case of the present example embodiment, since the projector 11 includes the phase modulation-type spatial light modulator 13, the phase distribution corresponding to the projection light 140 is stored in the projection condition storage unit 151. Furthermore, the projection condition storage unit 151 stores projection conditions including a light source control condition for controlling the light source 12 and a modulation element control condition for controlling the spatial light modulator 13.

The projection condition setting unit 153 is connected to the leakage determination unit 19, the projection condition storage unit 151, the modulator control unit 155, and the light source control unit 157. The projection condition setting unit 153 sets a projection condition for projecting projection light. Specifically, the projection condition setting unit 153 sets, in the modulator control unit 155, a modulation element control condition for setting a pattern corresponding to the projection light 140 to the modulation part of the spatial light modulator 13. Furthermore, the projection condition setting unit 153 sets, in the light source control unit 157, a light source control condition for emitting the laser light 110 from the laser emitter 121. The projection condition setting unit 153 synchronizes a timing at which the modulation element control condition is set in the modulator control unit 155 with the timing at which the light source control condition is set in the light source control unit 157 to display a desired image in the display area.

The projection condition setting unit 153 acquires a pattern corresponding to the projection light 140 and a modulation element control condition which is a condition for setting the pattern in the modulation part of the spatial light modulator 13 from the projection condition storage unit 151. A pattern corresponding to projection light 140 is a phase distribution. The modulation element control condition is a condition for setting a pattern corresponding to the projection light 140 in the modulation part of the spatial light modulator 13.

The projection condition setting unit 153 acquires, from the projection condition storage unit 151, a light source control condition for controlling the timing of emitting light from the projector 11 and the output of light to be emitted. The light source control condition is a condition for controlling the timing at which the laser emitter 121 emits the laser light 110 and the output of the laser light 110 emitted from the laser emitter 121.

The projection condition setting unit 153 transmits the pattern and the modulation element control condition corresponding to the projection light 140 to the modulator control unit 155, and transmits the light source control condition to the light source control unit 157. The projection condition setting unit 153 synchronizes the timing of transmitting the pattern corresponding to the projection light 140 and the modulation element control condition to the modulator control unit 155 with the timing of transmitting the light source control condition to the light source control unit 157.

The modulator control unit 155 is connected to the projection condition setting unit 153 and the spatial light modulator 13. The modulator control unit 155 receives the pattern corresponding to the projection light 140 and the modulation element control condition from the projection condition setting unit 21. The modulator control unit 155 drives a driver (not illustrated) that changes the pattern set to the modulation part of the spatial light modulator 13 according to the modulation element control condition received from the projection condition setting unit 21, and changes the pattern set to the modulation part of the spatial light modulator 13.

The light source control unit 157 is connected to the projection condition setting unit 153 and the light source 12. The light source control unit 157 drives a driving unit (not illustrated) of the laser emitter 121 according to the light source control condition received from the projection condition setting unit 21, and causes the laser emitter 121 to emit the laser light 110.

The timing at which the pattern is set in the modulation part of the spatial light modulator 13 is synchronized with the timing at which the laser light 110 is emitted to the modulation part in which the pattern is set. That is, the laser light 110 is emitted at the timing when the pattern is set in the modulation part of the spatial light modulator 13, and the modulation part of the spatial light modulator 13 is irradiated with the parallel light 120 converted from the laser light 110, and thus, the projection light 140 corresponding to the pattern is projected.

The configuration of the projection control unit 15 included in the gas detection device 10 is described above. Note that FIG. 10 is an example and does not limit the configuration of the projection control unit 15.

[Leakage Determination Unit]

Figure 11:
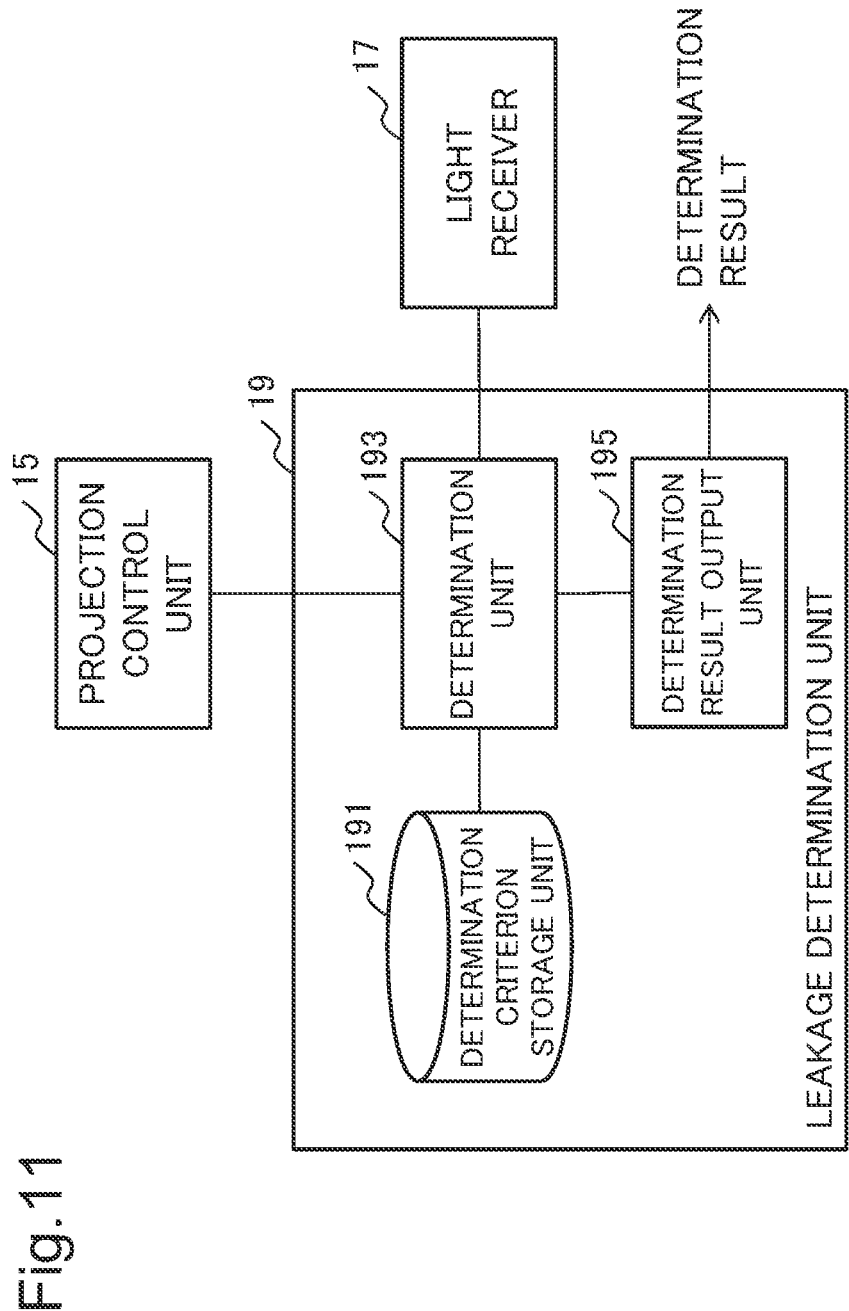
FIG. 11 is a block diagram illustrating an example of a configuration of a leakage determination unit included in the gas detection device included in the gas detection system according to the example embodiment.

Next, a configuration of the leakage determination unit 19 included in the gas detection device 10 will be described with reference to the drawings. FIG. 11 is a block diagram illustrating an example of a configuration of the leakage determination unit 19. The leakage determination unit 19 includes a determination criterion storage unit 191, a determination unit 193, and a determination result output unit 195.

The determination criterion storage unit 191 is connected to the determination unit 193. The determination criterion storage unit 191 stores a threshold serving as a determination criterion for the concentration of the detection target gas.

The determination unit 193 is connected to the projection control unit 15, the light receiver 17, the determination criterion storage unit 191, and the determination result output unit 195. The determination unit 193 acquires the intensity of the reflected light from the light receiver 17. The determination unit 193 calculates the concentration of the detection target gas using the intensity of the reflected light acquired from the light receiver 17. The determination unit 193 compares the calculated concentration with the threshold stored in determination criterion storage unit 191, and determines whether the detection target gas in detection space 170 is leaked. For example, when the calculated concentration is larger than the threshold, the determination unit 193 determines that the detection target gas is leaking in the detection space 170. The determination unit 193 outputs the determination result to the determination result output unit 195.

At the time of the calibration, the determination unit 193 transmits a calibration instruction to the projection control unit 15. The reflected light of the projection light projected in response to the calibration instruction is received by the light receiver 17. The determination unit 193 receives the intensity of the reflected light received by the light receiver 17 from the light receiver 17. The determination unit 193 detects a timing at which the intensity of the reflected light is maximized or maximum. For example, when the timing at which the projection control unit 15 changes the projection direction of the projection light 140 is set in advance at the time of calibration, the direction of the retroreflector 100 can be estimated by detecting the timing at which the intensity of the reflected light is maximized or maximum. The determination unit 193 transmits an instruction to project the projection light 140 in the estimated direction of the retroreflector 100 to the projection control unit 15. Note that a process of transmitting the calibration instruction at the time of calibration and a process of estimating the direction of the retroreflector 100 based on the intensity of the reflected light may not be imposed on the determination unit 193, and components that execute each of these processes may be added to the leakage determination unit 19.

Furthermore, when measuring the distance between the gas detection device 10 and the retroreflector 100, the determination unit 193 transmits a distance measurement instruction to the projection control unit 15. The reflected light of the projection light projected in response to the distance measurement instruction is received by the light receiver 17. The determination unit 193 calculates the distance between the gas detection device 10 and the retroreflector 100 based on a time $t_1$ at which the projection light is projected from the projection control unit 15 and a time $t_2$ at which the reflected light is received by the light receiver 17. For example, the distance L between the gas detection device 10 and the retroreflector 100 is calculated using the following Equation 3.

$$L=(t_2-t_1) \times c/2 \quad (3)$$

In Equation 3, c represents the speed of light. Since Equation 3 is satisfied under ideal conditions using the speed of light c in vacuum, some correction may be actually necessary. For example, in order to measure the distance between the gas detection device 10 and the retroreflector 100, a distance sensor using triangulation, a time of flight (TOF) camera, an ultrasonic sensor, a displacement sensor, or the like may be mounted on the gas detection device 10.

The determination result output unit 195 is connected to the determination unit 193. The determination result output unit 195 receives the determination result from the determination unit 193. The determination result output unit 195 outputs the received determination result.

The configuration of the leakage determination unit 19 included in the gas detection device 10 is described above. Note that FIG. 11 is an example, and the configuration of the leakage determination unit 19 is not limited to the configuration of FIG. 11.

[Calibration]

Figure 12:
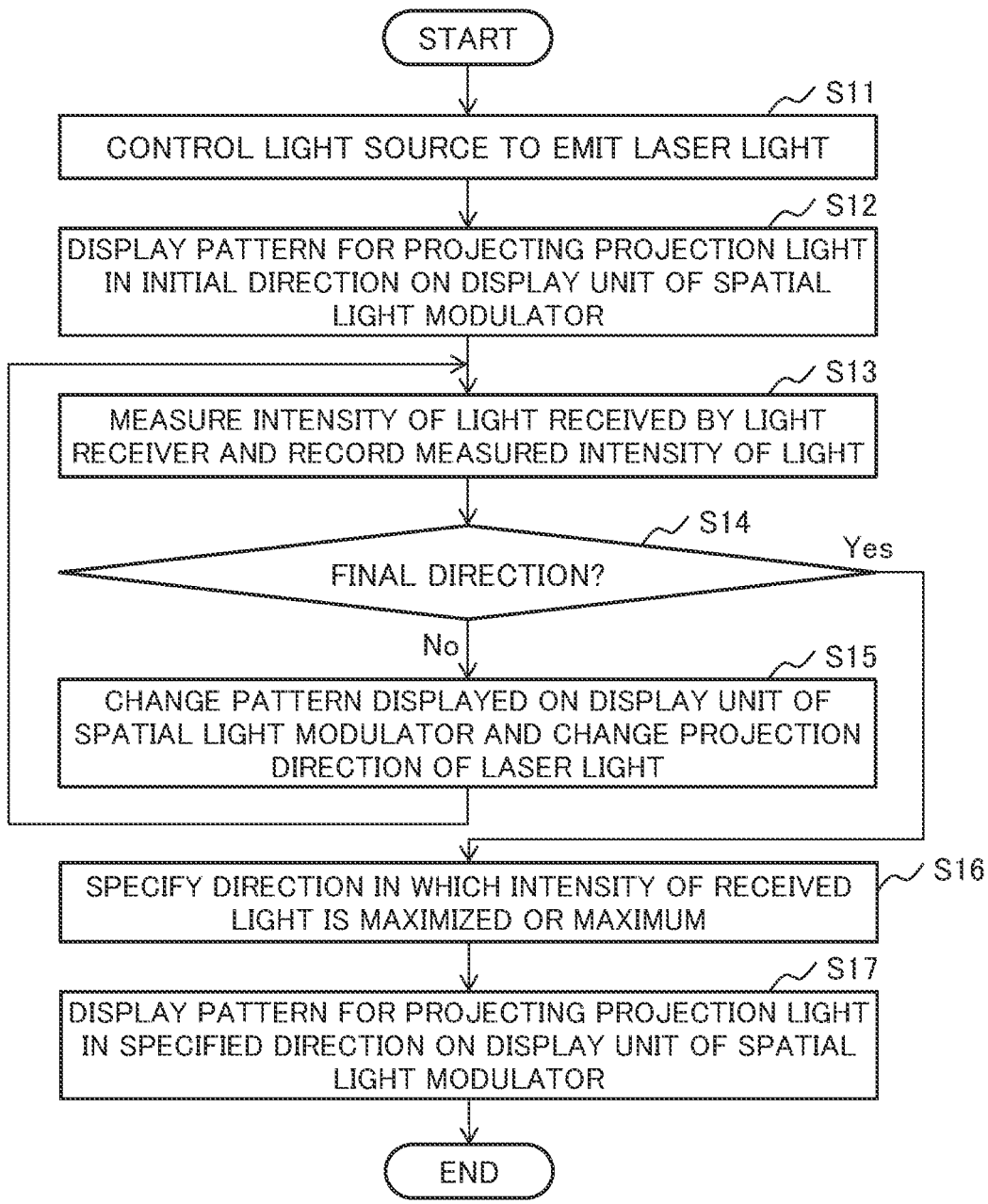
FIG. 12 is a flowchart for explaining calibration in the gas detection device included in the gas detection system according to the example embodiment.

Next, calibration executed by the gas detection device 10 in order to project projection light toward the retroreflector 100 will be described with reference to the drawings. FIG. 12 is a flowchart for explaining the calibration in the gas detection device 10. Hereinafter, the gas detection device 10 will be mainly described with reference to the configuration of FIG. 6.

In FIG. 12, first, the gas detection device 10 controls the laser emitter 121 of the light source 12 to emit the laser light 110 (Step S11). In this case, the light source 12 emits the parallel light 120 converted by the collimator 123 toward the modulation part of the spatial light modulator 13.

Next, the gas detection device 10 sets a pattern for the projection light 140 to be projected in an initial projection direction (also referred to as an initial direction) at the time of performing calibration in the modulation part of the spatial light modulator 13 (Step S12). Note that the pattern set in the modulation part of the spatial light modulator 13 at the time of calibration is assumed to be set in advance for each projection direction verified by the calibration.

Next, the gas detection device 10 measures the intensity of the light received by the light receiver 17, and records the measured intensity of the light in association with the projection direction (Step S13).

Here, in a case where it is not the last projection direction (also referred to as a final direction) at the time of performing calibration (No in Step S14), the gas detection device 10 changes the pattern set in the modulation part of the spatial light modulator 13 to the pattern in the next projection direction (Step S15). As a result, the projection direction of projection light 140 is changed. After Step S15, the process returns to Step S13.

Meanwhile, in the case of the last projection direction (also referred to as the final direction) in performing the calibration (Yes in Step S14), the gas detection device 10 specifies the direction in which the intensity of the received light is maximized or maximum (Step S16).

Then, the gas detection device 10 changes the pattern set in the modulation part of the spatial light modulator 13 to a pattern for projecting projection light in the specified projection direction (Step S17). As a result, the projection direction of projection light 140 is changed to a direction in which the intensity of the received light is maximized or maximum. When there is one retroreflector 100, the gas detection device 10 sets the projection direction of the projection light 140 to one direction. When there is a plurality of retroreflectors 100, the gas detection device 10 sets the projection direction of the projection light 140 to be switched to a plurality of directions. In addition, in a case where the reflection surface of the retroreflector 100 is widened, the gas detection device 10 sets the projection direction of the projection light 140 so as to scan the reflection surface of the retroreflector 100.

The calibration by the gas detection device 10 is described above. Note that the processing along the flowchart of FIG. 12 is an example, and the calibration by the gas detection device 10 of the example embodiment is not limited to the processing of FIG. 12.

As described above, the gas detection system of the present example embodiment includes the gas detection device and at least one retroreflector that retroreflects the laser light projected from the gas detection device.

In one aspect of the present example embodiment, the gas detection device includes a projector, a projection control unit, a light receiver, and a leakage determination unit. The projector includes a light source that emits laser light having a wavelength with a high absorption rate by the detection target gas, and a spatial light modulator that modulates the laser light emitted from the light source. The projection control unit controls the projection light to be projected from the projector toward the retroreflector by causing the light source to emit the laser light and setting the pattern of the modulation part of the spatial light modulator. The light receiver receives reflected light of projection light reflected by the retroreflector, and measures intensity of the received reflected light. The leakage determination unit acquires the intensity of the reflected light from the light receiver, and determines leakage of the detection target gas in the detection space with the retroreflector based on the intensity of the reflected light.

In the present example embodiment, a projection direction of projection light is controlled by changing a pattern of a modulation part of a spatial light modulator without using a mechanism that operates mechanically. Therefore, according to the present example embodiment, a detection target gas can be detected over a wide range without using the mechanism that operates mechanically. Furthermore, according to the present example embodiment, a detection space can be expanded by widening a reflection surface of a retroreflector or increasing the number of retroreflectors.

In one aspect of the present example embodiment, the leakage determination unit determines that the detection target gas leaks in the detection space when the intensity of the reflected light falls below a threshold. According to the present aspect, since the leakage determination can be made based on the threshold, the detection of the detection target gas in the detection space is facilitated.

In one aspect of the present example embodiment, the leakage determination unit measures a concentration of the detection target gas in the detection space using an intensity of the projection light and the intensity of the reflected light. According to the present aspect, even in a case where the detection space is wide, it is possible to easily measure the concentration of the detection target gas in the detection space by increasing the area and the number of reflection surfaces of the retroreflector without increasing the number of gas detection devices.

In one aspect of the present example embodiment, the projection control unit executes calibration of changing a projection direction of the projection light projected from the projector and setting a projection direction in which the intensity of the reflected light received by the light receiver is maximized or maximum as the projection direction of the projection light. According to the present aspect, since the projection direction of the projection light can be automatically set, frequency of manual calibration and maintenance can be reduced.

In one aspect of the present example embodiment, the leakage determination unit measures a distance to the retroreflector using an intensity of the projection light and the intensity of the reflected light. The projection control unit controls the projector according to the distance measured by the leakage determination unit. According to the present aspect, since the projector is controlled according to the distance between the gas detection device and the retroreflector, the accuracy of the detection of the detection target gas and the concentration measurement in the detection space can be improved.

In one aspect of the present example embodiment, the leakage determination unit causes a display device to display a determination result regarding leakage of the detection target gas in the detection space. According to the present aspect, since the determination result regarding the leakage of the detection target gas in the detection space is displayed on the display device, it is easy to ensure the safety of the worker and the manager at the site where the detection target gas can be generated.

In one aspect of the present example embodiment, a gas detection system includes at least one reflecting mirror that reflects the laser light emitted from the gas detection device toward the at least one retroreflector. According to the present aspect, even when the projection direction of the projection light projected by the gas detection device and the reflection surface of the retroreflector cannot directly face each other, the projection light can be projected from the gas detection device toward the reflection surface of the retroreflector, and thus, the degree of freedom in the arrangement of the gas detection device and the retroreflector increases. By combining a plurality of reflecting mirrors and arranging them so that the projection light reaches from the gas detection device toward the reflection surface of the retroreflector, the detection space can be substantially expanded and a blind spot where the projection light does not reach can be reduced.

In the gas detection system according to one aspect of the present example embodiment, at least one of the gas detection device and the at least one retroreflector is mounted on the moving body. According to the present aspect, by mounting the gas detection device or the retroreflector on the moving body, the detection target gas can be detected even in a wide detection space such as outdoors. For example, when a position of a retroreflector mounted on a drone flying in the air is specified by a gas detection device mounted on an automobile traveling on the ground, and projection light is projected toward the specified position, it is possible to cope with even a wide detection space. Furthermore, for example, when a position of a retroreflector mounted on another drone flying in the air is specified by a gas detection device mounted on the drone flying in the air, and projection light is projected toward the specified position, it is possible to cope with even a wider detection space.

APPLICATION EXAMPLE

Next, an application example of the gas detection system 1 of the example embodiment will be described with reference to the drawings. FIGS. 13 to 17 are conceptual diagrams for describing an application example of the gas detection system 1.

Application Example 1

Figure 13:
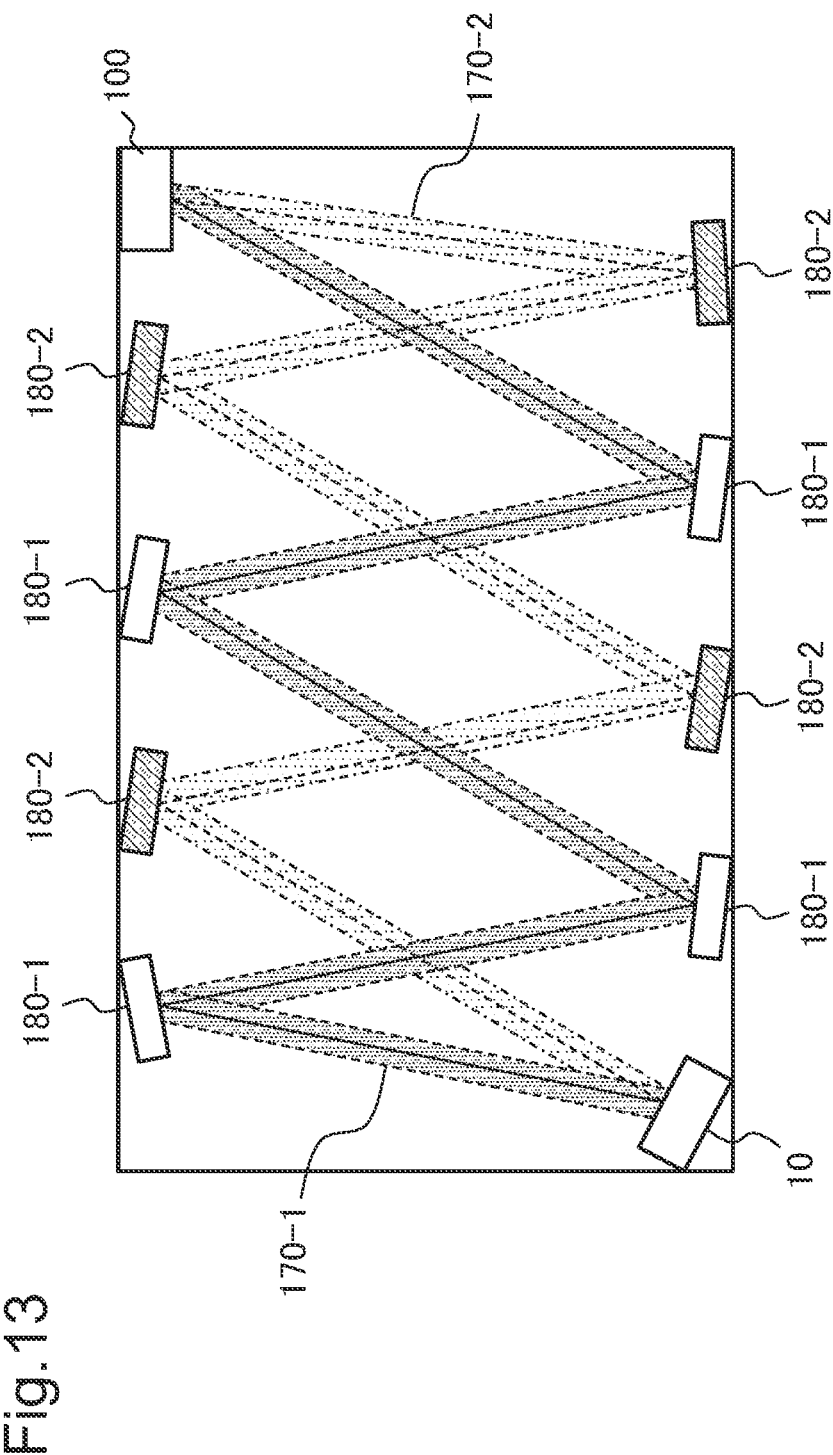
FIG. 13 is a conceptual diagram for explaining Application Example 1 of the gas detection system according to the example embodiment.

FIG. 13 illustrates an example (Application Example 1) in which the detection space formed between the gas detection device 10 and the retroreflector 100 is expanded by using a plurality of reflecting mirrors. FIG. 13 is a conceptual diagram of the interior in which the gas detection device 10 and the retroreflector 100 are installed as viewed from above. A plurality of reflecting mirrors that reflects the projection light from the gas detection device 10 and the reflected light reflected by the retroreflector 100 is disposed indoors.

In Application Example 1, the projection direction of the projection light projected from the gas detection device 10 is switched to two directions. The plurality of reflecting mirrors includes a plurality of first reflecting mirrors 180-1 for reflecting the projection light projected in a first direction toward the retroreflector 100, and a plurality of second reflecting mirrors 180-2 for reflecting the projection light projected in a second direction toward the retroreflector 100. The projection direction of the projection light may be set to three or more directions.

When the gas detection device 10 projects projection light in the first direction, the projection light is sequentially reflected by the plurality of first reflecting mirrors 180-1 and reaches the retroreflector 100. The projection light that has reached the retroreflector 100 is retroreflected by the reflection surface of the retroreflector 100, sequentially reflected by the plurality of first reflecting mirrors 180-1, and received by the gas detection device 10. When the gas detection device 10 projects the projection light in the first direction, the detection target gas can be detected in a detection space 170-1 (within a range of a broken line).

When the gas detection device 10 projects projection light in the second direction, the projection light is sequentially reflected by the plurality of second reflecting mirrors 180-2 and reaches the retroreflector 100. The projection light that has reached the retroreflector 100 is retroreflected by the reflection surface of the retroreflector 100, sequentially reflected by the plurality of second reflecting mirrors 180-2, and received by the gas detection device 10. When the gas detection device 10 projects the projection light in the second direction, the detection target gas can be detected in the detection space 170-2 (within the range of the alternate long and short dash line).

According to Application Example 1, by using a plurality of reflecting mirrors, the detection space 170 can be enlarged as compared with a case where projection light is directly projected from the gas detection device 10 toward the retroreflector 100. Furthermore, the detection space 170 can be further enlarged by switching the projection direction of the projection light projected from the gas detection device 10. When the output of the laser emitter included in the light source is sufficiently large, the detection space 170 can be enlarged by simultaneously projecting the projection light in different projection directions.

Application Example 2

Figure 14:
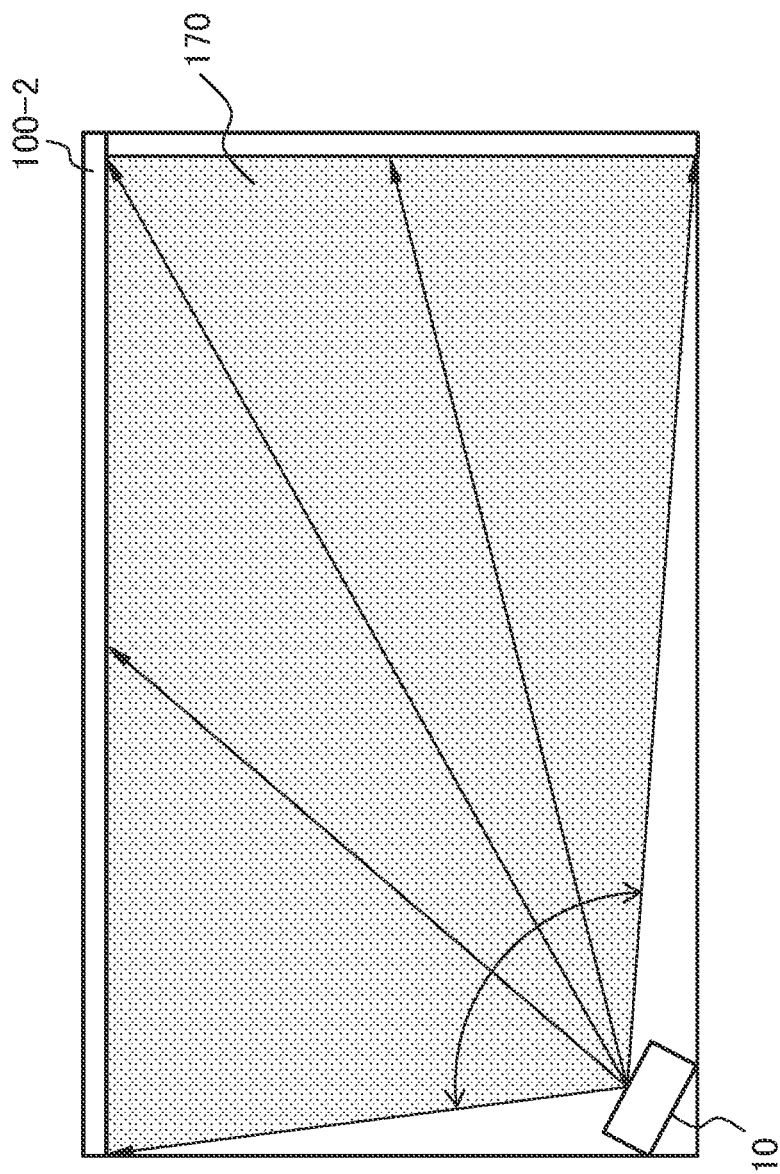
FIG. 14 is a conceptual diagram for explaining Application Example 2 of the gas detection system according to the example embodiment.

FIG. 14 illustrates an example (Application Example 2) in which a band-shaped retroreflector 100-2 is attached to a part of a room, and the detection space 170 is enlarged by scanning a projection direction of projection light projected from the gas detection device 10. FIG. 14 is a conceptual diagram of the interior in which the gas detection device 10 and the retroreflector 100-2 are installed as viewed from above. In the example of FIG. 14, a band-shaped retroreflector 100-2 is attached to two wall surfaces sandwiching a corner of a room, and a gas detection device 10 is installed at a corner position facing the corner. For example, the retroreflector 100-2 is attached in an upper portion of the wall when the detection target gas is lighter than air, and is attached in a lower portion of the wall when the detection target gas is heavier than air. Note that the retroreflector 100-2 may be attached to a ceiling or a floor of a room. Furthermore, since the retroreflector 100-2 only needs to be attached over a wide range, it is not limited to a band shape, and may have a surface of any shape.

In Application Example 2, the detection space 170 for the detection target gas can be enlarged by scanning a projection direction of projection light projected from the gas detection device 10 along the retroreflector 100-2. For example, the gas detection device 10 may project laser light having a short line segment and project the entire band-shaped retroreflector 100-2 divided into a plurality of regions. In this way, the scanning time can be shortened. In addition, the gas detection device 10 can also be configured to perform scanning with coarse accuracy until the detection target gas is detected, and when the detection target gas is detected, specify the position of the leakage point by precisely scanning around where the detection target gas is detected.

The projection direction of the projection light projected from the gas detection device 10 can be changed by changing the pattern set in the modulation part of the spatial light modulator. That is, in Application Example 2, the projection direction of the projection light can be changed without using a mechanical mechanism. In addition, when Application Example 1 and Application Example 2 are combined, the blind spots where the detection target gas is not detected can be reduced. When the output of the laser emitter included in the light source is sufficiently large, the detection space 170 can be enlarged by simultaneously projecting the projection light in different projection directions.

Application Example 3

Figure 15:
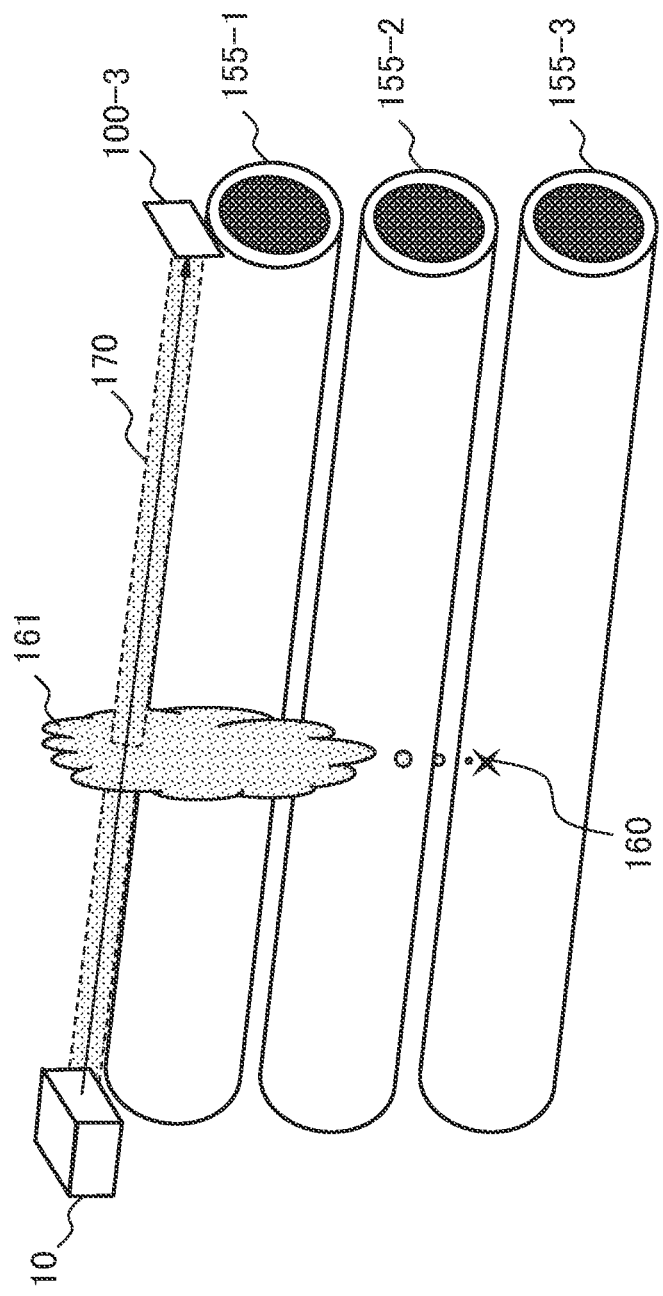
FIG. 15 is a conceptual diagram for explaining Application Example 3 of the gas detection system according to the example embodiment.
Figure 16:
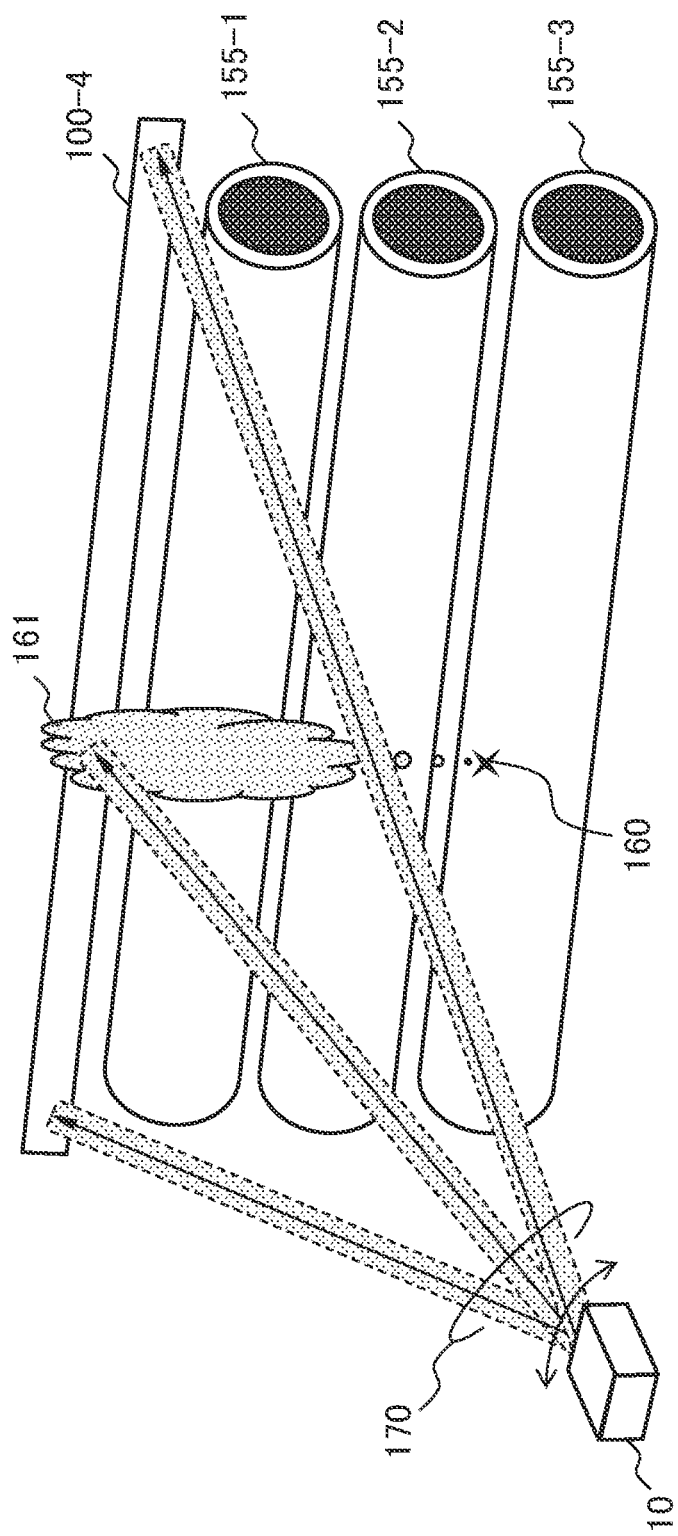
FIG. 16 is a conceptual diagram for explaining another example of Application Example 3 of the gas detection system according to the example embodiment.

FIGS. 15 and 16 illustrate an example (Application Example 3) in which leakage of the detection target gas from pipes 155-1 to 155-3 is detected using the gas detection device 10. FIGS. 15 and 16 illustrate an example in which a detection target gas 161 lighter than air leaks from a leakage point 160 of the lowermost pipe 155-3. Therefore, the retroreflector 100-3 is disposed above the pipes 155-1 to 155-3. When a detection target gas heavier than air is detected, the retroreflector 100-3 may be disposed below the pipes 155-1 to 155-3. The retroreflector 100-3 may be disposed between the pipes 155-1 to 155-3.

FIG. 15 illustrates an example in which the gas detection device 10 and the retroreflector 100-3 are disposed above the pipes 155-1 to 155-3, and projection light is projected along extending directions of the pipes 155-1 to 155-3. The detection space 170 is formed between the gas detection device 10 and the retroreflector 100-3. Since the detection target gas 161 leaked from the pipe 155-3 passes through the detection space 170, attenuation of projection light is detected by the gas detection device 10.

In FIG. 16, a band-shaped retroreflector 100-4 is disposed above the pipes 155-1 to 155-3 along the extending directions of the pipes 155-1 to 155-3, and the gas detection device 10 is disposed at a position where projection light can be projected on the reflection surface of the band-shaped retroreflector 100-4. In this example, the gas detection device 10 scans the projection light toward the retroreflector 100-4 along the extending directions of the pipes 155-1 to 155-3. In the example of FIG. 16, only three projection directions of the projection light are illustrated, but actually, the projection light is continuously scanned. The detection space 170 is formed between the gas detection device 10 and the retroreflector 100-4. Since the detection target gas 161 leaked from the pipe 155-3 passes through the detection space 170, attenuation of projection light is detected by the gas detection device 10.

In the example of FIG. 16, since a wide range is scanned as compared with the case of FIG. 15, a place where the detection target gas 161 leaks can be quickly detected. In the example of FIG. 16, leakage of the detection target gas can be detected not only immediately above the pipes 155-1 to 155-3 but also around the pipes 155-1 to 155-3. In the example of FIG. 16, the leakage position of the detection target gas 161 can be detected along the extending directions of the pipes 155-1 to 155-3. The retroreflector 100-4 may be disposed not above the pipes 155-1 to 155-3 but on the side surfaces of the pipes 155-1 to 155-3. When the retroreflector 100-4 is disposed on the side surfaces of the pipes 155-1 to 155-3 and the retroreflector 100-4 is scanned, the position where the detection target gas leaks can be specified more accurately.

Application Example 4

Figure 17:
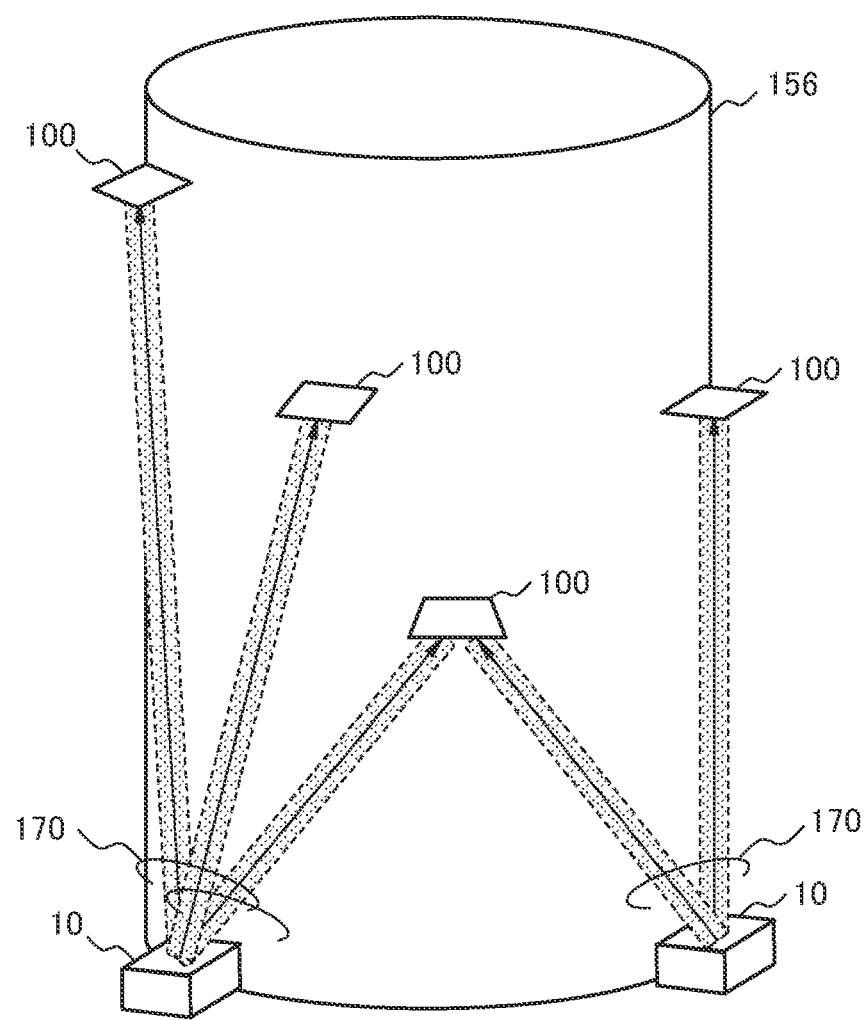
FIG. 17 is a conceptual diagram for explaining Application Example 4 of the gas detection system according to the example embodiment.

FIG. 17 illustrates an example (Application Example 4) in which the plurality of gas detection devices 10 is disposed at a lower portion on the side surface of the columnar structure with the projection direction facing upward, and the plurality of retroreflectors 100 is disposed an upper portion on the side surface of the columnar structure with the reflection surface facing downward. For example, the columnar structure is a gas tank, a chimney, a pipe, a heat exhaust pipe, or the like.

In Application Example 4, the detection target gas leaked from the side surface of the columnar structure can be detected. When a mirror is disposed between the gas detection device 10 and the retroreflector 100 as in Application Example 1, the number of installed gas detection devices 10 and retroreflectors 100 can be reduced.

When the columnar structure is a pipe or a chimney, the gas detection device 10 can detect the detection target gas leaked from these structures. Furthermore, when the gas detection device 10 can detect far infrared rays, the gas detection device 10 can also detect heat leaked from a columnar structure.

Application Example 5

Figure 18:
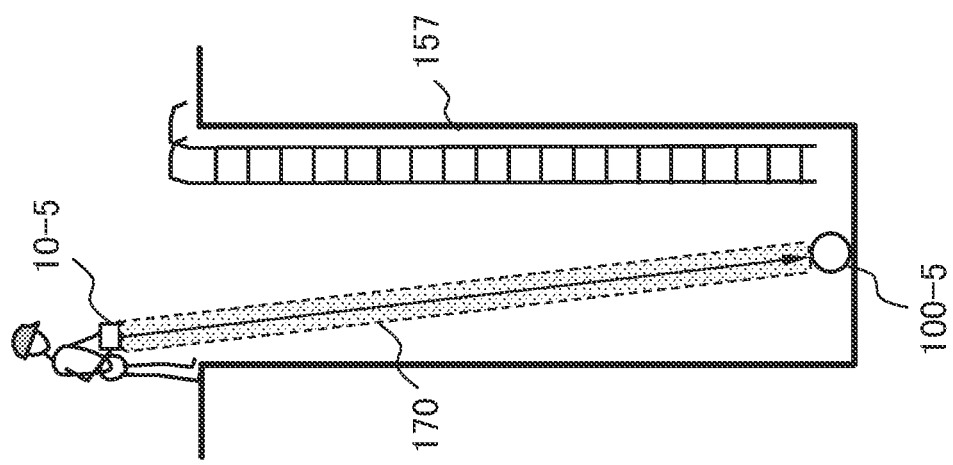
FIG. 18 is a conceptual diagram for explaining Application Example 5 of the gas detection system according to the example embodiment.

FIG. 18 illustrates an example (Application Example 5) in which the retroreflector 100-5 is dropped into a hole such as a well, projection light is projected from a portable gas detection device 10-5 that can be carried by a worker toward the retroreflector 100-5, and reflected light of the projection light is received to detect a detection target gas. The retroreflector 100-5 has a spherical shape, and a retroreflection surface is formed on a surface thereof. Since the retroreflector 100-5 has a spherical shape, it can reflect projection light from the portable gas detection device 10-5 in any arrangement. For example, when the retroreflector 100-5 is attached to the periphery of the rubber ball, even though the retroreflector is thrown into the hole, an article in the hole is hardly damaged, and the retroreflector 100-5 itself is also hardly damaged. Note that the shape of the retroreflector 100-5 may not be spherical as long as the retroreflection surface faces upward.

In Application Example 5, the detection space 170 is formed between the gas detection device 10-5 and the retroreflector 100-5. According to Application Example 5, it is possible to detect a detection target gas filling a recess such as a well. In addition, when a mirror is disposed between the gas detection device 10 and the retroreflector 100-5 as in Application Example 1, the detection space 170 can be enlarged.

Application Example 6

Figure 19:
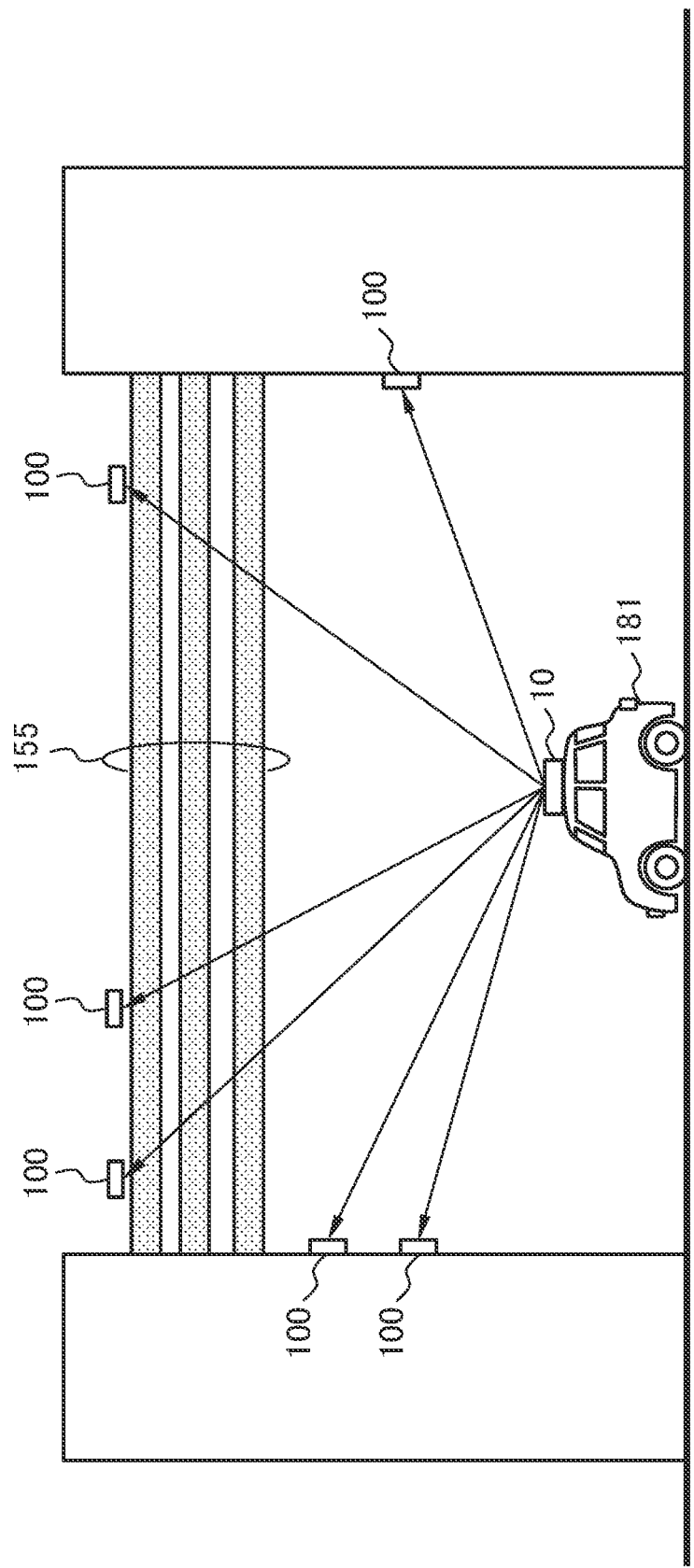
FIG. 19 is a conceptual diagram for explaining Application Example 6 of the gas detection system according to the example embodiment.
Figure 20:
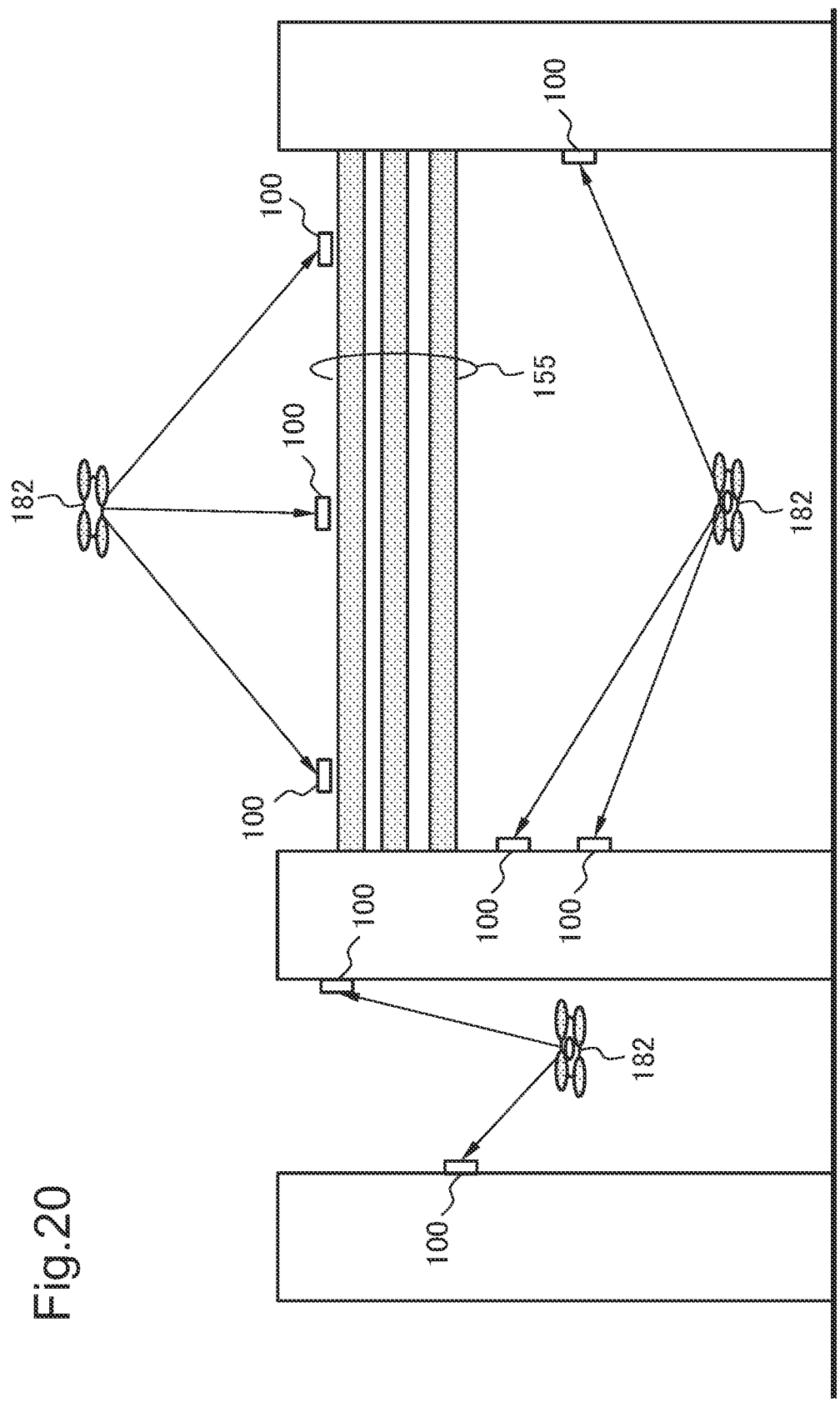
FIG. 20 is a conceptual diagram for explaining another example of Application Example 6 of the gas detection system according to the example embodiment.

FIGS. 19 to 21 illustrate an example (Application Example 6) in which the gas detection device 10 and the retroreflector 100 are mounted on a moving body such as an automobile and a drone.

FIG. 19 illustrates an example in which projection light is projected upward from the gas detection device 10 mounted on a ceiling of an automobile 181. As a usage scene as illustrated in FIG. 19, detection of gas leakage from a pipe disposed outdoors in a large-scale plant is assumed. For example, when the detection target gas is lighter than air, the retroreflector 100 having the reflection surface facing downward may be disposed above the pipe. In addition, for example, in a case where the detection target gas is heavier than air, the retroreflector 100 having the reflection surface facing the side may be disposed on a side surface of a support supporting the pipe. When projection light is projected from the gas detection device 10 mounted on the ceiling of the automobile 181 toward the reflection surface of the retroreflector 100 and reflected light of the projection light is received, the detection target gas can be detected in a large-scale space.

FIG. 20 illustrates an example in which projection light is projected from a gas detection device (not illustrated) mounted on a drone 182 toward the retroreflector 100. As a usage scene as illustrated in FIG. 20, detection of gas leakage from a pipe disposed outdoors in a large-scale plant is assumed, similarly to FIG. 19. When projection light is projected from the gas detection device mounted on the drone 182 toward the reflection surface of the retroreflector 100 and reflected light of the projection light is received, the detection target gas can be detected in a larger space. In addition, when the drone 182 is used, the detection target gas can be detected in a space that cannot be measured normally.

FIG. 21 illustrates an example in which a gas detection device (not illustrated) is mounted on the drone 182 and a retroreflector 100 is mounted on the automobile 185 or the drone 186. For example, when projection light is projected from the drone 182 toward the retroreflector 100 mounted on the automobile 185 or projection light is projected from the drone 182 toward the retroreflector mounted on the drone 186, the detection space can be flexibly expanded between the moving bodies.

The application examples of the gas detection system 1 of the example embodiment are described above. Note that the examples of FIGS. 13 to 21 are merely examples, and the use scene of the gas detection system 1 of the example embodiment is not limited to the examples of FIGS. 13 to 21.

(Hardware)

Here, a hardware configuration that implements the projection control unit and the leakage determination unit (hereinafter, referred to as a control device) included in the gas detection device according to the example embodiment will be described with an information processing device 90 of FIG. 22 as an example. Note that the information processing device 90 in FIG. 22 is a configuration example for executing processing of the control device according to the example embodiment, and does not limit the scope of the present invention.

As illustrated in FIG. 22, the information processing device 90 includes a processor 91, a main storage device 92, an auxiliary storage device 93, an input/output interface 95, and a communication interface 96. In FIG. 22, the interface is abbreviated as I/F (Interface). The processor 91, the main storage device 92, the auxiliary storage device 93, the input/output interface 95, and the communication interface 96 are data-communicably connected to each other via a bus 98. In addition, the processor 91, the main storage device 92, the auxiliary storage device 93, and the input/output interface 95 are connected to a network such as the Internet or an intranet via the communication interface 96.

The processor 91 develops the program stored in the auxiliary storage device 93 or the like in the main storage device 92 and executes the developed program. In the example embodiment, a software program installed in the information processing device 90 may be used. The processor 91 executes processing by the control device according to the example embodiment.

The main storage device 92 has an area in which a program is developed. The main storage device 92 may be a volatile memory such as a dynamic random access memory (DRAM). In addition, a nonvolatile memory such as a magnetoresistive random access memory (MRAM) may be configured and added as the main storage device 92.

The auxiliary storage device 93 stores various data. The auxiliary storage device 93 includes a local disk such as a hard disk or a flash memory. Note that various data may be stored in the main storage device 92, and the auxiliary storage device 93 may be omitted.

The input/output interface 95 is an interface for connecting the information processing device 90 and a peripheral device. The communication interface 96 is an interface for connecting to an external system or device through a network such as the Internet or an intranet based on a standard or a specification. The input/output interface 95 and the communication interface 96 may be shared as an interface connected to an external device.

An input device such as a keyboard, a mouse, or a touch panel may be connected to the information processing device 90 as necessary. These input devices are used to input information and settings. When the touch panel is used as the input device, the display screen of the display device may also serve as the interface of the input device. Data communication between the processor 91 and the input device may be mediated by the input/output interface 95.

Furthermore, the information processing device 90 may be provided with a display device for displaying information. In a case where a display device is provided, the information processing device 90 preferably includes a display control device (not illustrated) for controlling display of the display device. The display device may be connected to the information processing device 90 via the input/output interface 95.

The above is an example of a hardware configuration for enabling the control device according to the example embodiment. Note that the hardware configuration of FIG. 22 is an example of a hardware configuration for executing arithmetic processing of the control device according to the example embodiment, and does not limit the scope of the present invention.

A program for causing a computer to execute processing related to the control device according to the example embodiment is also included in the scope of the present invention. Further, a program recording medium in which the program according to the example embodiment is recorded is also included in the scope of the present invention. The recording medium can be achieved by, for example, an optical recording medium such as a compact disc (CD) or a digital versatile disc (DVD). Furthermore, the recording medium may be achieved by a semiconductor recording medium such as a universal serial bus (USB) memory or a secure digital (SD) card, a magnetic recording medium such as a flexible disk, or another recording medium. When a program executed by the processor is recorded in a recording medium, the recording medium corresponds to a program recording medium.

The components of the control device of the example embodiment can be arbitrarily combined. In addition, the components of the control device according to the example embodiment may be implemented by software or may be implemented by a circuit.

While the present invention has been particularly shown and described with reference to example embodiments thereof, the present invention is not limited to these example embodiments. It will be understood by those of ordinary skill in the art that various changes in form and details may be made therein without departing from the spirit and scope of the present invention as defined by the claims.

This application is based upon and claims the benefit of priority from Japanese patent application No. 2019-219663, filed on Dec. 4, 2019, the disclosure of which is incorporated herein in its entirety by reference.

REFERENCE SIGNS LIST 1 gas detection system
10 gas detection device
11 projector
12 light source
13 spatial light modulator
14 projection optical system
15 projection control unit
17 light receiver
19 leakage determination unit
20 control device
100 retroreflector
101 base material
102 spherical bead
103 focal layer
104 reflection layer
105-1 to 3 reflecting mirror
151 projection condition storage unit
153 projection condition setting unit
155 modulator control unit
157 light source control unit
190 display device
191 determination criterion storage unit
193 determination unit
195 determination result output unit

What is claimed is:
1. A gas detection device comprising:
a projector including a light source that emits laser light having a wavelength absorbed by a detection target gas and a spatial light modulator that modulates the laser light emitted from the light source;
a light receiver that receives reflected light of the projection light reflected by a retroreflector and measures an intensity of the received reflected light; and
a control device that includes at least one memory storing instructions and at least one processor connected to the at least one memory, the at least one processor configured to execute the instructions to:
control projection light to be projected toward the retroreflector by causing the light source to emit the laser light and setting a pattern of a modulation part of the spatial light modulator; and
acquire the intensity of the reflected light from the light receiver and determine leakage of the detection target gas in a detection space with the retroreflector based on the intensity of the reflected light.
2. The gas detection device according to claim 1, wherein the at least one processor is configured to execute the instructions to
determine that the detection target gas leaks in the detection space when the intensity of the reflected light falls below a threshold.
3. The gas detection device according to claim 1, wherein the at least one processor is configured to execute the instructions to
measure a concentration of the detection target gas in the detection space using an intensity of the projection light and the intensity of the reflected light.
4. The gas detection device according to claim 1, wherein the at least one processor is configured to execute the instructions to
execute calibration of changing a projection direction of the projection light projected from the projector and setting a projection direction in which the intensity of the reflected light received by the light receiver is maximized as the projection direction of the projection light.
5. The gas detection device according to claim 1, wherein the at least one processor is configured to execute the instructions to
measure a distance between the retroreflector and the control device by using an intensity of the projection light and the intensity of the reflected light, and
control the projector in accordance with the distance measured by the leakage determination unit.
6. The gas detection device according to claim 1, wherein the at least one processor is configured to execute the instructions to cause a display device to display a determination result regarding leakage of the detection target gas in the detection space.
7. A gas detection system comprising:
the gas detection device according to claim 1; and
at least one retroreflector that retroreflects the laser light projected from the gas detection device.
8. The gas detection system according to claim 7, further comprising:
at least one reflecting mirror that reflects the laser light emitted from the gas detection device toward the at least one retroreflector.
9. The gas detection system according to claim 7, wherein at least one of the gas detection device and the at least one retroreflector is mounted on a moving body.
10. A gas detection method comprising:
controlling a projector including a light source that emits laser light having a wavelength absorbed by a detection target gas and a spatial light modulator that modulates the laser light emitted from the light source to emit the laser light from the light source;

setting a pattern of a modulation part of the spatial light modulator to project projection light toward a retroreflector;

acquiring an intensity of the reflected light received by a light receiver that receives the reflected light of the projection light reflected by the retroreflector; and determining leakage of the detection target gas in a detection space with the retroreflector based on the intensity of the reflected light.

* * * * *